United States Patent
Yoshida et al.

(10) Patent No.: US 8,912,888 B2
(45) Date of Patent: Dec. 16, 2014

(54) INFORMATION STORAGE MEDIUM, OBJECT OF MANAGEMENT AND MANAGEMENT SYSTEM

(75) Inventors: Takahiko Yoshida, Yamatokoriyama (JP); Toshiharu Shimai, Yamatokoriyama (JP); Masato Matsushita, Yamatokoriyama (JP)

(73) Assignee: Nitta Corporation, Osaka (JP)

( * ) Notice: Subject to any disclaimer, the term of this patent is extended or adjusted under 35 U.S.C. 154(b) by 580 days.

(21) Appl. No.: 13/064,263

(22) Filed: Mar. 15, 2011

(65) Prior Publication Data

US 2011/0241836 A1    Oct. 6, 2011

(30) Foreign Application Priority Data

Mar. 30, 2010  (JP) ............................... P2010-079873

(51) Int. Cl.
| | | |
|---|---|---|
| *H04Q 5/22* | (2006.01) | |
| *G08B 13/14* | (2006.01) | |
| *H01Q 9/16* | (2006.01) | |
| *H01Q 19/00* | (2006.01) | |
| *H01Q 19/10* | (2006.01) | |
| *G06K 19/077* | (2006.01) | |

(52) U.S. Cl.
CPC .... *G06K 19/07749* (2013.01); *G06K 19/07771* (2013.01)
USPC ................ 340/10.1; 340/572.1; 340/572.7; 340/572.8; 343/793; 343/833; 343/834

(58) Field of Classification Search
USPC .............. 340/572.1, 572.7, 572.8, 10.1–10.4; 234/435; 343/700 MS
See application file for complete search history.

(56) References Cited

U.S. PATENT DOCUMENTS

| | | | | |
|---|---|---|---|---|
| 4,847,625 | A  * | 7/1989 | Dietrich et al. | ........ 343/700 MS |
| 5,955,949 | A  * | 9/1999 | Cocita | ......................... 340/572.1 |
| 6,163,260 | A  * | 12/2000 | Conwell et al. | ............. 340/572.8 |
| 7,215,296 | B2 * | 5/2007 | Abramov et al. | .............. 343/834 |

(Continued)

FOREIGN PATENT DOCUMENTS

| | | |
|---|---|---|
| EP | 1 548 639 | 6/2005 |
| EP | 2 144 328 | 1/2010 |

(Continued)

OTHER PUBLICATIONS

European Office Action dated Feb. 29, 2012, issued in corresponding European Patent Application No. 11250305.7.

(Continued)

*Primary Examiner* — Daniel Wu
*Assistant Examiner* — Mohamed Barakat
(74) *Attorney, Agent, or Firm* — Harness, Dickey & Pierce, P.L.C.

(57) ABSTRACT

An information storage medium, a managed product and a management system in which the possible communication distance of an IC tag for wireless communication can be improved and the reading direction limitation can be reduced are provided. The information storage medium includes a wireless IC tag in which information is stored, a sheet body including a first spacer, an auxiliary antenna and a second spacer, and an elongated member formed of a conductive material. The elongated member is provided to be opposite to the wireless IC tag with respect to the sheet body. As the elongated member, for example, a part of a tool such as a body portion of a screwdriver can be used.

10 Claims, 14 Drawing Sheets

(56) References Cited

U.S. PATENT DOCUMENTS

| | | | |
|---|---|---|---|
| 7,250,867 B2 | 7/2007 | Sakama et al. | |
| 7,315,248 B2 * | 1/2008 | Egbert | 340/572.7 |
| 7,619,582 B2 * | 11/2009 | Chung et al. | 343/876 |
| 7,705,733 B2 * | 4/2010 | Tethrake et al. | 340/572.8 |
| 7,812,775 B2 * | 10/2010 | Babakhani et al. | 343/754 |
| 7,911,343 B2 * | 3/2011 | Rossman et al. | 340/572.1 |
| 8,203,488 B2 * | 6/2012 | Soler Castany et al. | 343/700 MS |
| 2005/0138798 A1 | 6/2005 | Sakama et al. | |
| 2005/0140512 A1 * | 6/2005 | Sakama et al. | 340/572.7 |
| 2007/0096852 A1 * | 5/2007 | Lawrence et al. | 333/195 |
| 2007/0229276 A1 | 10/2007 | Yamagajo et al. | |
| 2008/0122704 A1 * | 5/2008 | King | 343/702 |
| 2010/0035539 A1 * | 2/2010 | Yoshida et al. | 455/1 |

FOREIGN PATENT DOCUMENTS

| | | |
|---|---|---|
| JP | 2005210676 | 8/2005 |
| JP | 2007272264 | 10/2007 |
| JP | 2009134709 | 6/2009 |
| WO | WO 2008123515 A1 * | 10/2008 |

OTHER PUBLICATIONS

Search Report dated Jun. 30, 2011, in corresponding European Patent Application No. 11250305.7.

* cited by examiner

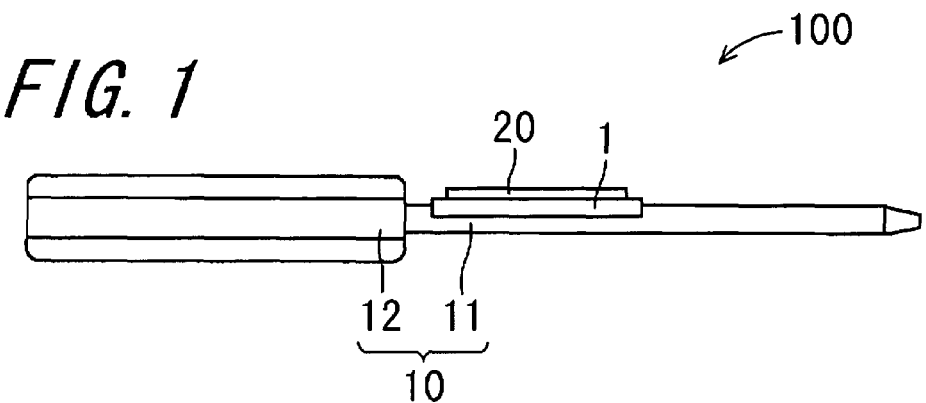
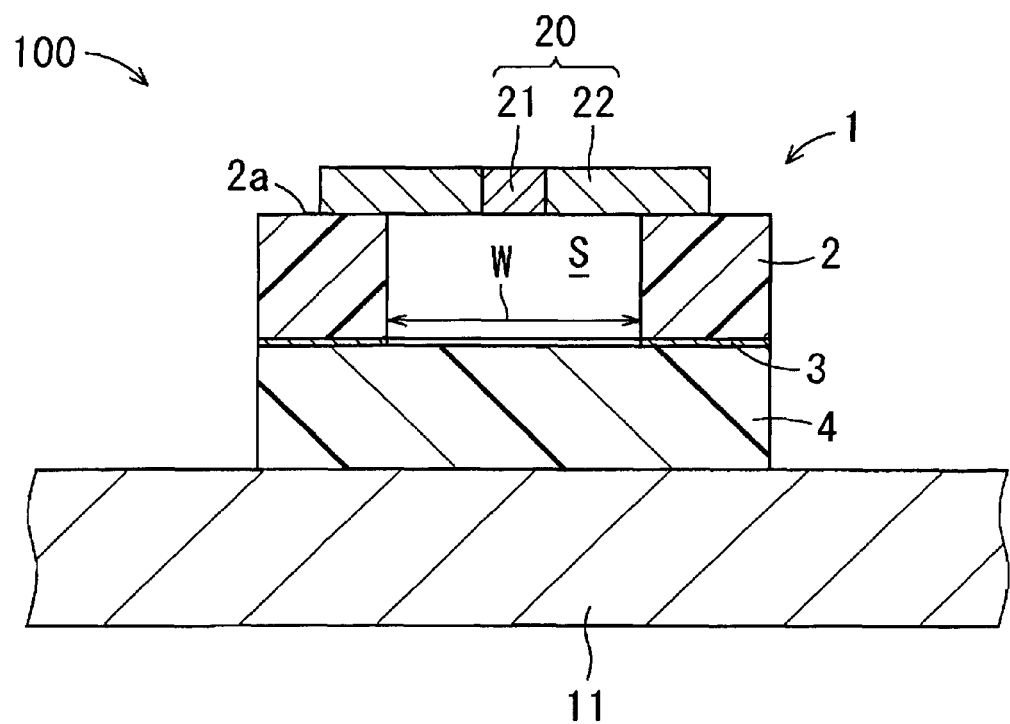

INFORMATION STORAGE MEDIUM, OBJECT OF MANAGEMENT AND MANAGEMENT SYSTEM

BACKGROUND OF THE INVENTION

1. Field of the Invention

The invention relates to an information storage medium, a managed product and a management system that use IC tags for wireless communication.

2. Description of the Related Art

Wireless communication technology is applied not only to the field of information and communication but also to the field of logistics management, and IC tags for wireless communication (hereinafter referred to simply as "IC tags" or "tags"), which are widely known as products that support the RFID (Radio Frequency Identification) technology, have a wide variety of applications including use in logistics management and as inexpensive information storage mediums. For this reason, wireless communication equipment will be used in a variety of application environments.

IC tags can be classified into passive tags that do not have their own power source and active tags having a power source. The passive tags, which are low cost and versatile, receive a radio wave from a reader and activate the tag circuit by using this energy, thereby enabling wireless communication.

IC tags each include an IC chip for storing data, such as identification number, and an antenna for transmission and reception of radio waves, and have great advantages including a thin and lightweight design and a wireless communication capability. The chip includes a memory region, and therefore information management is possible using information stored in the memory region, and the IC tag serves as an information storage medium. IC tags are also called "tags", "wireless IC tags", "RFID tags" or "RF tags". In the invention, a combination of a commercially available IC tag and a sheet body of the invention is referred to as a "tag". In order to distinguish this from others, such a combination of an IC tag and a sheet body will be referred to as a "tag according to the invention".

In order to make full use of the advantages, it is considered preferable that there is no limitation on the tag application position and that IC tags are configured to be capable of communication regardless of the application position.

IC tags, however, are designed for use in free space, and in the case of using a radio wave in the high frequency band, the ultra-high frequency band or the microwave band, general-purpose tags performs transmission and reception of radio wave communication, using a so-called dipole antenna, and thus if there is a metal or the like in the vicinity of the antenna, the communication characteristics of the antenna are degraded and a possible communication distance is reduced.

When a wireless radio wave impinges on a metal surface, reflection occurs with a phase shift by $\lambda/2$. In other words, incident and reflected waves cancel each other in the vicinity of the metal. In the vicinity of the metal, the composite electric field becomes close to 0, and thus the supplied electric field energy will be reduced significantly as compared to that in free space.

Also, if there is a conductive material such as a metal in the vicinity of the antenna, when a resonance current flows through the antenna, a current reverse to the resonance current is induced on the metal side, and the input impedance of the antenna is reduced greatly due to the induced current, failing to match the impedance of the IC chip designed for use in free space, and reducing the possible communication distance. Also, if the same magnitude of current flows in parallel in a reverse direction in the vicinity of the antenna, the orientation of magnetic fields generated around the currents is reversed, causing the magnetic fields to cancel each other, and as a result, the radio waves do not travel far and the possible communication distance is reduced.

Other than metals, materials such as paper, glass, resins and liquids can also degrade the communication characteristics of IC tags.

In the case of these materials, the resonance frequency of the antenna changes due to the dielectric constant and the magnetic permeability of these materials, causing a shift between the frequency of radio wave used by the communication receiver and the resonance frequency of the antenna, and thus the possible communication distance is reduced.

Japanese Unexamined Patent Publication JP-A 2009-134709 discloses a wireless communication improving sheet body with which the possible communication distance can be improved even in the vicinity of a communication disturbing member such as a metal.

With the wireless communication improving sheet body disclosed in JP-A 2009-134709, the possible communication distance can be extended by using it when, for example, an IC tag is affixed to a metal surface.

However, use of the wireless communication improving sheet body inevitably creates, in the IC tag, a possible communication position and an impossible communication position. When an attempt is made to read the IC tag from the back side of the wireless communication improving sheet body, or in other words, an opposite side of an arrangement surface of the IC tag, by using the reader, reading is almost impossible.

When an attempt is made to apply such IC tags to management of members, for example, because the IC tags include an unreadable region, information cannot be read from the IC tags unless all of the IC tags face the reader, and consequently member management will be substantially impossible. From the viewpoint of member management, there is a demand to make the unreadable region as small as possible.

SUMMARY OF THE INVENTION

It is an object of the invention to provide an information storage medium, a managed product and a management system in which the possible communication distance of a wireless communication IC tag can be improved and the reading direction limitation is reduced.

The invention provides an information storage medium comprising:
  a wireless IC tag in which information is stored;
  a sheet body including
    a first spacer having an arrangement surface on which the wireless IC tag is arranged,
    an auxiliary antenna provided on a surface opposite to the arrangement surface of the first spacer, having a hole, notch or gap, and
    a second spacer being opposite to the first spacer with respect to the auxiliary antenna; and
  an elongated member formed of a conductive material,
  the wireless IC tag being arranged on the arrangement surface without wire connection to the auxiliary antenna, and
  the elongated member being provided to be opposite to the wireless IC tag with respect to the sheet body.

According to the invention, the information storage medium includes a wireless IC tag in which information is stored, a sheet body and an elongated member formed of a conductive material.

The sheet body includes a first spacer, an auxiliary antenna and a second spacer. The first spacer has an arrangement surface on which the wireless IC tag is arranged. The auxiliary antenna has a hole, notch or gap, and is provided on a surface opposite to the arrangement surface of the first spacer. The second spacer is opposite to the first spacer with respect to the auxiliary antenna. The wireless IC tag is arranged on the arrangement surface without wire connection to the auxiliary antenna. The elongated member is provided to be opposite to the wireless IC tag with respect to the sheet body.

With the sheet body, even in the vicinity of the elongated member formed of a conductive material, the wireless IC tag is able to communicate, and due to the elongated member functioning as an antenna, the reading direction limitation of the wireless IC tag can be reduced.

Also, in the invention, it is preferable that the elongated member is a strip-shaped metal member or a rod-shaped metal member.

According to the invention, it is preferable that the elongated member is a strip-shaped metal member or a rod-shaped metal member. By configuring the elongated member to such a shape, the elongated member can efficiently perform the antenna function.

Also, in the invention, it is preferable that the elongated member is a metal member having at least one of a linear portion, a curved portion and a bent portion.

According to the invention, it is preferable that the elongated member is a metal member having at least one of a linear portion, a curved portion and a bent portion. By using a metal member having such a shape as the elongated member, the communication distance of the antenna function can be extended and the wavelength of the communication frequency can be broadened, and thus enhanced performance and size reduction can be achieved.

Also, in the invention, it is preferable that the elongated member is a metal member that constitutes a part of a tool or device.

According to the invention, by using a metal member that constitutes a part of a tool as the elongated member, the tool can be efficiently managed by using the wireless IC tag.

Also, in the invention, it is preferable that the information storage medium further comprises a back side conductor layer provided between the second spacer and the elongated member.

According to the invention, the information storage medium further comprises a back side conductor layer provided between the second spacer and the elongated member.

In the invention, it is preferable that the hole, notch or gap is provided so as to face the IC chip or a reactance loading area included in the wireless IC tag.

According to the invention, the hole, notch or gap is provided so as to face the IC chip or a reactance loading area included in the wireless IC tag, whereby the influence of the auxiliary antenna as a conductive material on the wireless IC tag can be reduced, and the effect of the sheet body to improve communication can be further enhanced.

Also, in the invention, it is preferable that at least one of the first spacer and the second spacer is formed of foam.

According to the invention, at least one of the first spacer and the second spacer is formed of foam. By using foam, weight reduction and thickness reduction can be achieved.

Also, in the invention, it is preferable that a part or all of an outer surface is coated with a dielectric material.

According to the invention, a part or all of an outer surface is coated with a dielectric material. The influence of unwanted external electromagnetic waves and the influence of surrounding environment can thereby be reduced, further improving the communication improving effect and further imparting waterproof property, impact resistance and insulation.

The invention also provides a managed product comprising the information storage medium described above.

According to the invention, a managed product comprises the information storage medium described above. The information storage medium may be internally or externally provided. Accordingly, an RFID function, a tag function and a wireless communication function can be easily imparted to a tool, an instrument, a device, equipment and the like as managed products, and a tool, and such an instrument, a device, equipment, information or the like can be managed using the information storage medium.

The invention also provides a management system comprising:

the information storage medium or managed product described above;

a reading device that reads the information stored in the wireless IC tag from the information storage medium through wireless communication; and a management apparatus that manages the information storage medium based on the information read by the reading device and a communication status when the reading device reads the information from the information storage medium.

According to the invention, the reading device reads the information stored in the wireless IC tag from the information storage medium through wireless communication, and the management apparatus manages the information storage medium based on the information read by the reading device and a communication status when the reading device reads the information from the information storage medium. Management of tools and the like, which was conventionally done based on visual inspection or an operator's report, can thereby be efficiently performed.

BRIEF DESCRIPTION OF THE DRAWINGS

Other and further objects, features, and advantages of the invention will be more explicit from the following detailed description taken with reference to the drawings wherein:

FIG. 1 is an external view of an information storage medium according to an embodiment of the invention;

FIG. 2 is a cross-sectional view showing a configuration of the information storage medium;

DETAILED DESCRIPTION

Figure 3:
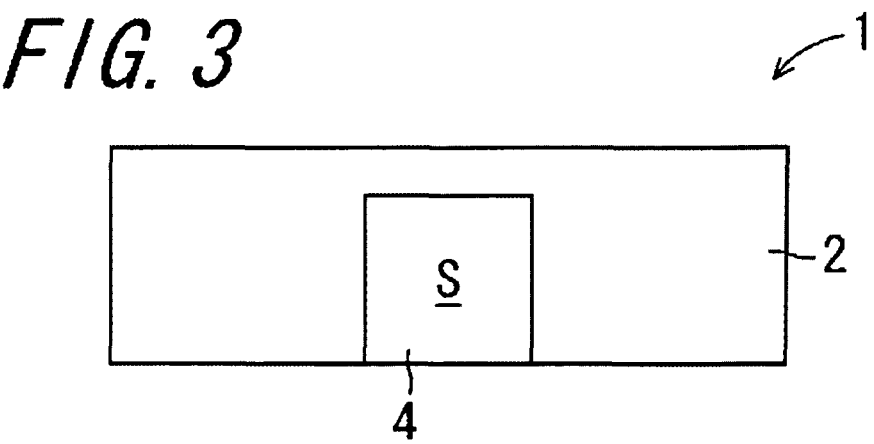
FIG. 3 is a plan view of the sheet body.

Now referring to the drawings, preferred embodiments of the invention are described below.

An information storage medium according to the invention includes a wireless IC tag in which information is stored, a sheet body and an elongated member formed of a conductive material, wherein the wireless IC tag and the elongated member are arranged on opposite sides of the sheet body. The sheet body is formed by laminating a first spacer, an auxiliary antenna and a second spacer, and the auxiliary antenna is provided with a hole, notch or gap.

FIG. 1 is an external view of an information storage medium 100 according to an embodiment of the invention. The present embodiment will be described taking an example in which, a body portion 11 of a screwdriver 10 serving as a work tool is used as the elongated member.

The information storage medium 100 includes a sheet body 1, a screwdriver 10 and a wireless IC tag 20.

The screwdriver 10 includes a body portion 11 and a grip portion 12. The body portion 11 is formed of a conductive material such as a high carbon steel wire rod, and the grip portion 12 is formed of a non-conductive material such as a wood or resin. The wireless IC tag 20 is arranged on the surface of the sheet body 1, and the body portion 11 of the screwdriver 10 is arranged on the side opposite to the wireless IC tag 20.

According to conventional technology, when a wireless IC tag is attached to a screwdriver, it has been considered that the small tag is embedded somewhere in the grip portion. In this case, it is necessary to design and manufacture a dedicated screwdriver for embedding the tag, and the user had to purchase the custom-made product. Moreover, when the grip portion is grasped by the human hand, the small tag becomes unable to communicate, and therefore stable long-distance communication and RFID communication are not possible due to limitation of the tag size.

FIG. 2 is a cross-sectional view showing a configuration of the information storage medium 100.

The wireless IC tag 20 includes an IC chip 21 in which information is stored and an antenna 22 capable of transmission and reception of a radio wave of a specific frequency.

The sheet body 1 includes a laminate of a first spacer 2 having an arrangement surface 2a in which the wireless IC tag 20 is arranged without wire connection, an auxiliary antenna 3 provided on a surface opposite to the arrangement surface 2a of the first spacer 2, and a second spacer 4 provided to be opposite to the first spacer 2 with respect to the auxiliary antenna 3, and a hole, notch or gap S is provided in the auxiliary antenna 3. Hereinafter, the hole, notch or gap will be given the same reference sign S even when they are individually referred to.

Fundamentally, when the wireless IC tag 20 is arranged in the vicinity of the body portion 11 formed of a conductive material, the wireless communication is obstructed and thus the communication distance is reduced, but use of the sheet body 1 enables wireless communication.

First, improvement of communication of the wireless IC tag 20 by the sheet body 1 will be described.

The sheet body 1 enables improvement of communication of the wireless IC tag 20, with the hole (slot), notch (slit) or gap provided in the auxiliary antenna 3. The antenna 22 of the wireless IC tag 20 and the auxiliary antenna 3 are electromagnetically coupled via the hole, notch or gap S, enabling wireless communication via the auxiliary antenna 3, and as a result improving the possible communication distance.

By providing a hole, notch or gap S in the auxiliary antenna 3, in the hole, notch or gap S, an electric field is generated along the long-axis direction of the shape of the antenna according to the resonant operation of the antenna 22 of the wireless IC tag 20, and thus the electromagnetic coupling between the antenna 22 (and the IC chip 21) and the auxiliary antenna 3 is stimulated through the hole, notch or gap. Furthermore, since the hole, notch or gap S increases the electrical resistance of the conductor layer, it is possible to suppress the induced current corresponding to the antenna generated in the conductor layer.

Through the hole, notch or gap S, the auxiliary antenna 3 can, without wire connection to the wireless IC tag 20, function to pass the electromagnetic energy to and from the wireless IC tag 20, and transmission paths of information to and from the IC chip 21 can be superposed within the hole, notch or gap S, whereby the auxiliary antenna 3 can also respond to, in addition to the conventional antenna operation with the far end, an operation mechanism to pass the electromagnetic energy to and from the wireless IC tag 20 provided in the vicinity.

The auxiliary antenna 3 is configured to be resonant to the wireless communication frequency as a whole when it is combined with the wireless IC tag 20, and a resonant layer of the auxiliary antenna 3 may include one or more resonant portions, but the resonant portion has dimensions that fall within a range of $\lambda/8$ to $3\lambda/4$, where the wavelength of a radio wave of the wireless communication frequency is defined as $\lambda$.

As described above, by simply attaching the sheet body 1 to the wireless IC tag 20, the sheet body 1 can improve the communication of the wireless IC tag 20. Commercially available wireless IC tags have different chip impedance values due to their designs. This impedance varies between when they are at rest and when they are in operation, and it also changes depending on the amount of received energy even under operation conditions. Impedance matching and improvement can be achieved by simply attaching the sheet body 1 to such a wireless IC tag having an unstable and variable impedance.

Furthermore, unlike a patch antenna, the sheet body 1 is capable of transmission and reception of radio waves by using a conductor arranged adjacent thereto or in the vicinity as an antenna via electromagnetic coupling, and thus by using the elongated member formed of a conductive material or an attached material as an antenna, an increased effect can be produced.

By providing the sheet body 1 between the wireless IC tag 20 and the body portion 11, which is the elongated member, the influence of mutual interference between the wireless IC tag 20 and the body portion 11 of the screwdriver 10 can be eliminated, and the antenna function can be passed on to the body portion 11, which is the elongated member.

The elongated member formed of a conductive material arranged in the vicinity of the wireless IC tag 20 can be thereby used as an antenna rather than a communication disturbing member, and therefore the reading direction limitation of the wireless IC tag 20 can be reduced.

For example, when the direction in which the body portion 1 extends is set as the center axis and reading of the wireless IC tag 20 is performed about the axis, the wireless IC tag 20 can be read from the entire circumference of the axis.

When the wireless IC tag 20 is arranged in the sheet body 1, the information stored in the wireless IC tag 20 cannot be read from the side opposite to the wireless IC tag 20, but by providing an elongated member as in the invention, the information stored in the wireless IC tag 20 can be read even from the opposite side of the wireless IC tag 20, or in other words, from the elongated member side.

Conventionally, when the wireless IC tag 20 is arranged in the sheet body 1, due to the presence of a back side conductor layer or a conductive attached material having a similar function that is provided on the sheet body 1, the direction in which radio wave communication is possible is limited to directions in which the back side conductor layer or conductive attached material is not present. In other words, a so-called dead zone where radio waves are not received is created in the direction in which the back side conductor layer or conductive attached material is present, and thus wireless communication is null in this direction.

There are of course cases where communication is established even in such a dead zone portion due to leakage of radio waves, but this is not by design and the communication performance is insufficient. The invention is designed such that the back side conductor layer or conductive attached material, neither of which was conventionally intended to send radio waves, is used as an antenna. As a result, it is possible to provide a long communication distance, wide directivity and broadband characteristics in comparison to conventional technology. In the case where the back side conductor layer or conductive attached material does not function as an antenna (for example, in the case where the back side conductor layer, elongated member or attached material is placed on a metal plate having a large area), the sheet body 1 functions as an auxiliary antenna to assist communication.

The reason that the elongated member can function as an antenna as described above is that the hole, notch or gap S provided in the auxiliary antenna 3 of the sheet body 1 protects the IC chip 21 of the wireless IC tag 20 from the influence of the elongated member, and feed matching from the antenna is maintained, as a result of which the IC chip 21 and the body portion 11, which is the elongated member, can be coupled contactlessly by electromagnetic coupling, or via the conductive portion. As a result, the antenna that transmits and receives radio waves can be selected from among the auxiliary antenna 3 of the sheet body 1 and the body portion 11, which is the elongated member, while using the IC chip 21 of the wireless IC tag 20.

As described above, by using the elongated member formed of a conductive material as an antenna, the wireless communication dead zone can be eliminated, and the reading direction limitation of the wireless IC tag 20 can be reduced. Furthermore, an antenna having a sufficient length can be obtained, and thus communication characteristics are also improved. The antenna that operates in this case can be, but it not limited to, for example, a representative dipole antenna.

Where the wavelength of the resonance frequency of the wireless IC tag 20 is defined as $\lambda$, the resonant length of the dipole antenna is represented by $(\lambda/2) \times n$ (n: integer), and it is only necessary that a portion having this size is present somewhere in the elongated member. The higher the resonance frequency, the smaller the size needed to achieve resonance becomes, and thus the overall size of the information storage medium can be reduced. For example, the wavelength $\lambda$ of a 953 MHz band, which is a UHF frequency band approved for RFID use, is approximately 31.5 cm, and the elongated member having a length that is an integral multiple of approximately 15.7 cm that is $\lambda/2$ functions as a dipole antenna. The dipole antenna is a high-performance antenna having a high radiation efficiency, so that a sufficient communication distance can be obtained even if the length does not completely match the resonant length. The resonant portion is dependent on the length of a path through which the resonance current flows in the conductive material, and therefore does not necessarily match the outer size of the conductive material.

In the present embodiment, the body portion 11 of the screwdriver 10 is used as the elongated member. Work tools such as a screwdriver and measuring tools such as a straight-edge (hereinafter also referred to simply as "tools") are configured, from the viewpoint of human-engineering, to have a length between approximately one half and equal to the length from the human palm to the elbow and to be capable of operations such as pinching, twisting and pressing. This length corresponds to an integral multiple of approximately 14 cm to 18 cm, which is $\lambda/2$ of a radio wave of the UHF frequency band internationally approved for RFID use.

The main constituent elements of tools are often formed of a metal material, and thus a tool itself to which the wireless IC tag 20 and the sheet body 1 are attached can function as a dipole antenna.

The elongated member can function not only as a dipole antenna, but also as a monopole antenna, loop antenna, slit antenna or patch antenna by changing the shape of the elongated member, the arrangement position of the sheet body 1 with respect to the elongated member, and the like as appropriate. The elongated member preferably has a shape including at least one of a linear portion, a curved portion and a bent portion. Accordingly, the elongated member can be bent for use, and it is also possible to provide the elongated member with a curvature or a serpentine configuration. The member may be internally provided with a hollow, a plurality of members may be combined, or a composite of them may be adopted. Furthermore, the elongated member may be provided with a hole or notch, and may be a three-dimensional structure obtained by bending, folding, assembling or the like. The elongated member may also function as a holder such as a nail or stake, or as an attachment piece.

The antenna function can be thereby passed on to the elongated member, and by using it as an antenna for wireless communication of the wireless IC tag 20, the position (null region) where wireless communication is not possible can be eliminated, and longer-distance communication can be achieved.

Also, when the elongated member having the antenna function is used as an outer sheath layer, a highly rigid metal can be used as the outer sheath layer, and therefore impact resistance can be easily imparted to the information storage medium.

The configuration of the sheet body 1 will be described below in detail. FIG. 3 is a plan view of the sheet body 1.

The sheet body 1 includes, as described above, the first spacer 2, the auxiliary antenna 3 and the second spacer 4, and the notch S having a groove-like shape is provided in the first spacer 2 and the auxiliary antenna 3.

The first spacer 2 is composed of a dielectric layer providing insulation between the antenna 22 of the wireless IC tag 20 and the auxiliary antenna 3.

The auxiliary antenna 3 resonates at the communication frequency of the wireless IC tag 20, and thereby electromagnetically couples to the antenna 22 of the wireless IC tag 20 and functions as a resonant antenna.

The second spacer 4 is composed of a dielectric layer providing insulation between the auxiliary antenna 3 and the body portion 11, which is the elongated member.

The first spacer 2, the auxiliary antenna 3 and the second spacer 4 all have the same external dimensions, and they are laminated in this order to constitute the sheet body 1.

The planar shape of the sheet body 1 when viewed from the laminated direction depends on the shape of the wireless IC tag that is mounted, this often being a rectangular shape. The total thickness of the sheet body 1 is approximately 0.5 to 15 mm.

In the present embodiment, the planar shape of the sheet body 1 is rectangular, and a linear notch (slit) S that is parallel to the short-side direction of the sheet body 1 and that is open in a center in the long-side direction is provided. Hereinafter, due to the shape of the linear notch, the notch S of the present embodiment may also be referred to as "IO type", and the sheet body 1 may also be referred to as an "IO type sheet body". In the plan view of FIG. 3, the notch S is positioned at substantially the center of the sheet body 1, but the notch S is not necessarily positioned at the center. The position of the notch S can be set as appropriate according to the position of the IC chip 21 of the wireless IC tag 20, a junction portion and a reactance loading area included therein.

As shown in the cross-sectional view of FIG. 2, the notch S is configured to pass through the first spacer 2 and the auxiliary antenna 3 in the laminated direction, and as a result, the second spacer 4 forms a bottom of the groove. Accordingly, the depth of the notch S is equal to the sum of the thickness of the first spacer 2 and the thickness of the auxiliary antenna 3. The depth can be, for example, 0.05 to 10 mm.

The notch S is formed to have a length L that is 3 to 97% of a length L0 in the short-side direction of the sheet body 1. The length L can be, for example, 3 to 194 mm.

The notch S has a width W of, for example, 1 to 180 mm although it depends on the size or the like of the IC chip 21, the junction portion and the reactance loading area included therein. By providing such a notch S, the antenna 22 of the wireless IC tag 20 arranged on the arrangement surface 2a and the auxiliary antenna 3 can be electromagnetically coupled via the notch S, and the auxiliary antenna 3 can function as a resonant antenna. Furthermore, by providing the notch S immediately below the IC chip 21, the influence of the auxiliary antenna 3 as a conductor on the IC chip 21 can be reduced.

The first spacer 2 and the second spacer 4 insulate the wireless IC tag 20 and the auxiliary antenna 3, and the auxiliary antenna 3 and the body portion 11, respectively, and the first spacer 2 and the second spacer 4 provide the influence of a wavelength shortening effect as dielectric layers, and thereby adjust the resonance frequency of the auxiliary antenna 3. A portion in which the electric field is 0 may be formed between the auxiliary antenna 3 and the body portion 11. In this case, operation is possible even when the auxiliary antenna 3 and the body portion 11 are electrically connected by providing a via-hole in the portion in which the electric field is 0.

The first spacer 2 and the second spacer 4 are preferably formed of a material having a low electromagnetic energy loss, or in other words, a material having a low dielectric loss tangent tan δ ($\in$"/$\in$') or magnetic loss tangent tan δ ($\mu$"/$\mu$') in the communication frequency band as long as the positional relationship between the wireless IC tag 20 and the auxiliary antenna 3 and that between the auxiliary antenna 3 and the body portion 11 can be maintained. For example, the first spacer 2 and the second spacer 4 may be spaces, but it is generally preferable to use any of organic materials as listed below.

As the organic materials, for example, polymer organic materials can be used such as rubber, thermoplastic elastomer, various plastics, wood and paper. It is also possible to use porous bodies thereof. Other than natural rubber, examples of the rubber include synthetic rubbers such as isoprene rubber, butadiene rubber, styrene-butadiene rubber, ethylene-propylene rubber, ethylene-propylene rubber, ethylene-propylene diene rubber (EPDM rubber), ethylene-vinyl acetate-based rubber, butyl rubber, halogenated butyl rubber, chloroprene rubber, nitrile rubber, acrylic rubber, ethylene acrylic rubber, epichlorohydrin rubber, fluorocarbon rubber, urethane rubber, silicone rubber, chlorinated polyethylene rubber and hydrogenated nitrile rubber (HNBR), as well as derivatives thereof, and modified versions thereof obtained by various modification treatments. These rubbers can be used alone or blended.

Examples of the thermoplastic elastomer include various thermoplastic elastomers including chlorine-based thermoplastic elastomer such as chlorinated polyethylene, ethylene-based copolymer, acrylic thermoplastic elastomer, ethylene acrylic copolymer-based thermoplastic elastomer, urethane-based thermoplastic elastomer, ester-based thermoplastic elastomer, silicone-based thermoplastic elastomer, styrene-based thermoplastic elastomer, amide-based thermoplastic elastomer and olefin-based thermoplastic elastomer, as well as derivatives thereof.

Furthermore, examples of the various plastics include thermoplastic resins and thermosetting resins such as polyethylene, polypropylene, AS resin, ABS resin, polystyrene, chlorine-based resins such as polyvinyl chloride and polyvinylidene chloride, polyvinyl acetate, ethylene-vinyl acetate copolymers, fluorine resins, silicone resins, acrylic resins, nylon, polycarbonate, polyethylene terephthalate (PET), ester-based resins, alkyd resins, unsaturated polyester, polysulfone, polyimide-based resins, polyester-based resins, urethane-based resins, phenol resins, urea resins, epoxy resins, as well as derivatives, copolymers and recycled resins thereof.

The materials listed above can be used as they are, or they may be compounded or modified for use. For example, by compounding a filler such as carbon, black lead, graphite, titanium oxide, carbon fiber, carbon tube or graphite fiber so as to increase the dielectric constant, size reduction of the sheet body 1 can be achieved due to the wavelength shortening effect. It is also possible to use a reinforced resin filled with a reinforcing material, and the materials used to constitute the wireless IC tag and the auxiliary antenna may be used as a spacer material, such as a substrate, a sticky material, an adhesive and a coating material.

For example, by mixing titanium oxide as a filler to EPDM rubber, a flexible spacer formed of a high dielectric constant material can be achieved. The first spacer 2 and the second spacer 4 may be formed of the same material or may be formed of different materials. In the case where they are formed of different materials, for example, a PET film can be used as the first spacer 2, and a mixed material of titanium oxide and EPDM rubber can be used as the second spacer 4.

The sheet body 1 can thereby be reduced in size, and flexibility can be imparted to the sheet body 1 so that the sheet body 1 can sufficiently fit to the shape of the elongated member.

It is preferable that the dielectric materials that constitute the first spacer 2 and the second spacer 4 have a density less than 1.0 g/cm$^3$.

As such dielectric material having a low density, it is possible to use one or more materials selected from porous organic materials and porous inorganic materials. A non-foamed material may be used, or a combination of a non-foamed material and a foamed material may be used. Other examples of spacer material include paper such as cardboard, wood, glass, glass fiber and soil-based material.

Any foaming method can be used, but the foaming method is classified into addition of a foaming agent, addition of thermally extendable microparticles, and the like. The foaming agent includes an organic foaming agent and an inorganic foaming agent.

Examples of the organic foaming agent that can be added include, but are not limited to, dinitrosopentamethylenetetramine DPT, azodicarbonamide (ADCA), p,p'-oxybis(benzenesulfonyl hydrazide) (OBSH) and hydrazodicarbonamide (HDCA).

An example of the inorganic foaming agent that can be added is, but not limited to, sodium hydrogen carbonate, but an appropriate inorganic foaming agent can be selected and added according to the material.

As the thermally extendable microparticles, microencapsulated thermally extendable microparticle microspheres or the like can be added. Furthermore, a hollow material formed of an inorganic or organic material can be added such as glass beads or glass hollow bodies.

There is no particular limitation on the foaming ratio, but it is necessary to set a foaming ratio that causes little change in absorber thickness, maintains strength and reduces weight. For this reason, the foaming ratio is preferably approximately 2 to 30 times.

There is no particular limitation on the foam structure, but it is preferable to use a configuration that is strong in the compression direction such as a foam form that has been foamed and flattened in the thickness direction.

Examples of the wood include, but are not essentially limited to, wooden materials such as plywood, i, particle wood board and MDF, and a plurality of materials may be combined and used.

Examples of the porous inorganic material include, but are not limited to, various ceramic materials, plaster board, concrete, foam glass, pumice, asphalt, and soil.

It is also possible to use a sticky material layer for bonding a substrate for the wireless IC tag 20 and a layer, as a spacer material. The sticky material layer may be provided partially rather than entirely. It is sufficient that the first spacer has a function of preventing electrical connection between the wireless IC tag 20 and the auxiliary antenna 3, and therefore there may be air or in other words, a space between the wireless IC tag 20 and the auxiliary antenna 3.

The first spacer 2 and the second spacer 4 need to change the received radio wave energy to transmission energy with a minimum loss, and therefore it is necessary to select a material having a minimum energy loss. To this end, in the frequency of the electromagnetic wave used by the wireless IC tag 20 to perform wireless communication, the dielectric loss tangent tan δ ($\in''/\in'$) is preferably 0.5 or less, and more preferably 0.2 or less.

The spacer material preferably has a high dielectric constant, flexibility and a low dielectric loss tangent tan δ ($\in''/\in'$), but the most important factor is a low dielectric loss tangent tan δ in the communication frequency band (UHF band or the like).

Furthermore, the sheet dimensions can be reduced in thickness and size as the real part $\in'$ of the complex relative permeability is increased, and therefore $\in'$ is preferably 1 to 50. However, the value of $\in'$ is not limited to the above because the sheet is configured with various parameters. The materials listed above can be used not only as materials of the first spacer 2 and the second spacer 4, but also as a dielectric material that coats a part or all of the outer surface of the information storage medium 100.

The auxiliary antenna 3 is formed of a conductive material having conductivity.

The conductive material constituting the auxiliary antenna 3 can be a metal such as gold, platinum, silver, nickel, chromium, aluminum, copper, zinc, lead, tungsten or iron, and it may also be a resin mixture obtained by mixing a resin with powders of any of the above metals and a conductive carbon-based material, or a conductive resin film. It may be also a foil, plate, sheet or film obtained by processing any of the above metals. Alternatively, the auxiliary antenna 3 may be configured by forming a thin metal layer having a thickness of, for example, 600 Å on a synthetic resin film. The auxiliary antenna 3 may also be obtained by transferring a metal foil onto a substrate such as a film or cloth. A conductive ink (having a sheet resistance of, for example, 10 Ω/sq. or less) may be applied to the first spacer 2 and the second spacer 4.

The resonant layer of the auxiliary antenna 3 has a size according to the wavelength corresponding to the radio wave of a specific frequency, but there is no limitation on the size of a back side conductor layer 5. The back side conductor layer 5 may be omitted when, for example, the sheet body 1 is attached to an electromagnetic shielding material that is attached only to a metal product, or in other words, a material having the same function as the back side conductor layer.

The notch S can be formed by commonly used forming methods. In the first spacer 2, the notch S can be formed by removing a predetermined portion that will be a hole or notch from a plate-like member formed of a dielectric material by means of mechanical processing such as punching or cutting, or chemical processing such as etching. It is also possible to mold a dielectric material into a shape having a hole or notch during molding although it depends on the dielectric material used.

Similarly, in the auxiliary antenna 3, the notch S can be formed by removing a predetermined portion that will be a hole or notch by means of mechanical or chemical processing as in the first spacer 2. It is also possible to subject the spacer to printing, deposition or application directly so as to obtain a shape including a notch.

With the above methods, the hole or notch may be formed separately in the first spacer 2 and the auxiliary antenna 3. Alternatively it is also possible to laminate the auxiliary antenna 3 on the first spacer 2 and form the hole or notch simultaneously in the first spacer 2 and the auxiliary antenna 3.

There is no limitation on the shape of the hole or notch as long as it can increase the electrical resistance. The hole, notch or gap may or may not necessarily be dimensioned to resonate with the frequency of the radio wave used for wireless communication.

Figure 4:
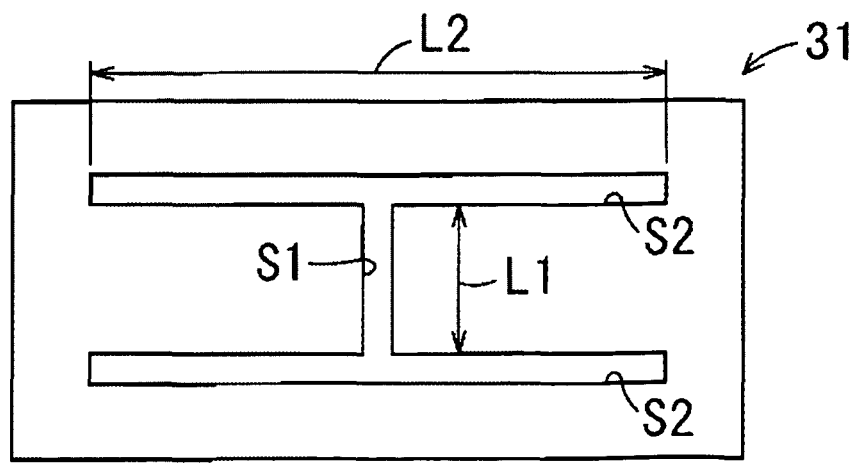
FIG. 4 is a plan view of a sheet body according to another embodiment of the invention.

FIG. 4 is a plan view of a sheet body 31 according to another embodiment of the invention. This embodiment is different only in the configuration of the sheet body from the embodiment shown in FIG. 2 and the like, and other constituting elements are the same as those of the embodiment described above. Accordingly, only a description of the sheet body 31 will be presented here.

In the present embodiment, the sheet body 31 has a rectangular planar shape. In a center in the long-side direction thereof, a linear hole S1 parallel to the width direction is provided, and two linear holes S2 parallel to the long-side direction are provided with a predetermined spacing therebetween in the short-side direction, such that the hole S1 and the holes S2 intersect in the center and the linear hole S1 does not protrude externally from the hole S1. Due to the shape including two holes S2 and a hole S1 provided so as to connect the holes S2 at the center, hereinafter, the holes S2 of the present embodiment may also be referred to as an H-shaped hole S2, and the sheet body 31 may also be referred to as an H-shaped sheet body.

The hole S1 and the holes S2 have a cross section similar to the cross-sectional view shown in FIG. 2, that is, they are configured to pass through the first spacer 2 and the auxiliary antenna 3 in the laminated direction, and as a result, the second spacer 4 forms a bottom of the groove. The hole S1 and the holes S2 have the same depth and width in the diagram, but they may have different depths and widths.

The depth of the holes S2 is equal to the sum of the thickness of the first spacer 2 and the thickness of the auxiliary antenna 3. The depth can be, for example, 0.1 to 10 mm. The width W of the hole S1 and the holes S2 depends on the size or the like of the IC chip, a junction portion and a reactance loading area included therein, but the width W can be, for example, 1 to 180 mm.

The hole S1 has a length L1 of, for example, 5 to 200 mm, and the holes S2 have a length L2 of, for example, 10 to 200 mm. It is also possible to use a configuration different from that of the present embodiment: for example, the intersecting portions between the hole S1 and the holes S2 may not necessarily be in the center, and the two holes S2 may have different lengths, widths and depths.

By providing such holes S1 and S2, the antenna 22 or the IC chip 21 of the wireless IC tag 20 arranged on the arrangement surface 2a and the auxiliary antenna 3 can be electromagnetically coupled via the holes S1 and S2, and the auxiliary antenna 3 can function as a resonant antenna. Furthermore, the hole S1 is provided directly below the IC chip 21, and the holes S2 are provided in a loop portion of the antenna 22, and therefore the influence of the auxiliary antenna 3 as a conductor on the IC chip 21 and the loop portion (reactance loading area) can be reduced.

Figure 5:
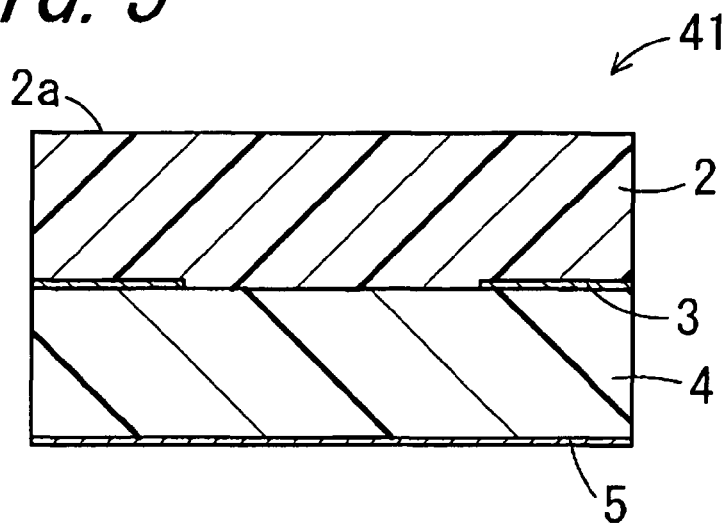
FIG. 5 is an enlarged cross-sectional view of a sheet body according to another embodiment of the invention.

FIG. 5 is an enlarged cross-sectional view of a sheet body 41 according to another embodiment of the invention. The above embodiments have been described with respect to the configuration in which the notch S or hole S1 having the second spacer 4 as the bottom is provided in the first spacer 2 and the auxiliary antenna 3, but it is also possible to use a configuration in which a hole, notch or gap is provided only in the auxiliary antenna 3 without providing a hole or notch in the first spacer 2.

As a production method of the present embodiment, a first spacer 2 without a hole or notch may be affixed to an auxiliary antenna 3 provided with a hole, notch or gap, or alternatively it is also possible to use a method in which a hole, notch or gap is provided in the first spacer 2 and the auxiliary antenna 3, and then the hole, notch or gap is filled.

The shape and number of the hole, notch or gap provided in the auxiliary antenna 3 are not limited to the examples shown in the diagrams. A plurality of holes may be formed or combined, or the hole may have a shape that completely divides the auxiliary antenna. The shape is not limited to polygonal shapes, and any shape can be used such as a linear shape, a rod shape, a circular shape, an arc shape, a curved shape and an indefinite shape. These may be distributed vertically or laterally.

Regarding the sheet body, in order to arrange the wireless IC tag 20 on the arrangement surface 2a and affix the elongated member on the surface opposite to the arrangement surface, it is preferable that at least one of these surfaces has a sticky material or an adhesive. In order to fix the attached material, a magnetic material, screwing, a fixing band or tape can be used. This facilitates arrangement of the wireless IC tag 20 and attachment of the sheet body to the elongated member.

The sheet body may be attached to the elongated member using, for example, a heat shrinkable cover member. The heat shrinkable cover member is initially formed into a cylindrical shape. The elongated member, the sheet body 1 and the wireless IC tag 20 are housed in the cylinder, followed by heating with hot air externally, and the cover member thereby shrinks so that the elongated member, the sheet body 1 and the wireless IC tag 20 can be fixed externally.

The material that can be used as the cover member is not limited to heat shrinkable materials, and any material can be used as long as the sheet body 1 and the wireless IC tag 20 can be fixedly attached to the elongated member by a stimulus or external factor. Examples of the stimulus or external factor include heat, pressure, temperature change, reaction and magnetic force. A physical method such as screwing or fastening can also be used.

Specific examples of the material include electron beam-crosslinked flexible polyolefin resin, electron beam-crosslinked flexible flame-retardant polyolefin resin, flexible flame-retardant polyvinyl chloride resin, electron beam-crosslinked semi-rigid flame-retardant polyvinylidene fluoride resin, ethylene-propylene rubber, silicone rubber and nitrile butadiene rubber, but the material is not limited thereto and various materials can be used.

The above description was given taking an example in which the body portion of a screwdriver was used as the elongated member, but the present embodiment is not limited thereto, and the elongated member may be a strip-shaped or rod-shaped metal member constituting a part of a tool.

Examples of the tool include a cutting tool, a work tool, and a measuring tool. Examples of the cutting tool include a turning tool, a drill, a milling cutter, a reamer, a gear cutting tool, a threading tool, a carbide tool, a hacksaw, a machine cutter, a wood saw, and a file. Examples of the work tool include a spanner, a wrench, pliers, a screwdriver, a stock vice, a hammer, and a piping tool. Examples of the measuring tool include a micrometer, a caliper, a gage, and a ruler.

In these tools, a portion that serves as a strip-shaped metal member or rod-shaped metal member, if any, can be used entirely as the elongated member.

It is important to manage tools as to whether the tools are in their proper place, or whether a tool has been removed from the proper place, but such determinations are dependent on visual inspection or reports from the operator who uses the tools, it thus cannot be said that a sufficient level of management has been achieved. Attempts were made to manage tools using conventional wireless IC tags, but when a wireless IC tag was affixed to a tool formed of a conductive material, the wireless IC tag became unable to communicate. Even when the wireless IC tag was able to communicate, the reading direction by the reader was limited, and therefore management using wireless IC tags was difficult. Only management by reading individual barcodes is in practical use.

In contrast, according to the invention, the wireless IC tag attached to a tool is able to communicate and can be read from any direction without limitation, and therefore management of tools becomes possible with the wireless IC tag. Also, due to a long readable distance, reading is possible from a tool stored in a light inaccessible place. This means that, for example, anything such as the position of a reinforcing material in a wall of a building, an object in an underground pipe or in water, a monitoring sensor, an electric light, an access point, an electric wire, a cable, wiring, steel stock, electronic equipment, monitoring equipment, or a pipe, a member, a steam pipe, a gas or water pipe, a communication line, an air-conditioning pipe arranged somewhere in a building or plant such as an air-conditioning system or arranged on or above the ceiling, under the floor or against a wall can be read using the reader from a spacious or safe location where workers are not exposed to danger such as inside a room, indoor, overground, above the floor or rooftop, so as to correct necessary data. In addition to managing the location of a product as described above, it is also possible to manage a variety of information regarding the product such as status management and environment management. Furthermore, information management is also possible using a sensor function that utilizes a difference in the reading performance of the information storage medium 100 that corresponds to the environment.

Furthermore, the wireless IC tag of the invention can easily impart a wireless communication function to electronic equipment such as a cell phone, industrial equipment, a manufacturing apparatus or the like by internally or externally being provided therein. The tools, members, devices, equipment, machines and the like externally or internally provided with the tag according to the invention easily enable wireless communication, tag management and RFID management, and therefore such tools, members, devices, equipment, machines and the like are also encompassed as managed products using the tag, which is an information storage medium, according to the invention.

Figure 6:
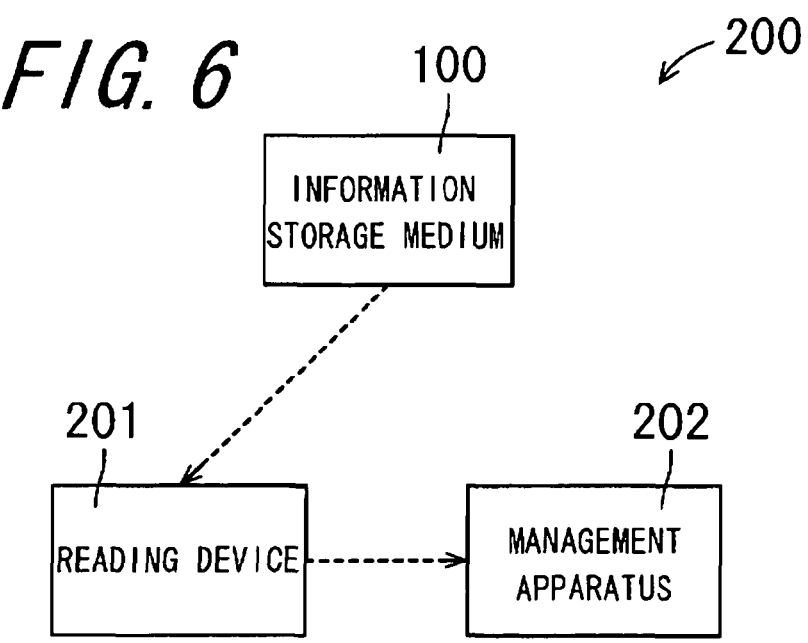
FIG. 6 is a block diagram showing a management system according to another embodiment of the invention.

A management system 200 according to still another embodiment of the invention is shown in a block diagram of FIG. 6. The management system 200 is constituted by an information storage medium 100 including a wireless IC tag in which information is stored, a sheet body and an elongated member; a reading device 201 that reads the information stored in the wireless IC tag from the information storage medium 100 through wireless communication; and a management apparatus 202 that manages the information storage medium 100 based on the information read by the reading device 201 and a communication status when the reading device 201 reads the information from the information storage medium 100. The reading device (reader) 201 may be a reader/writer having a writing function in addition to a reading function.

As the reading device 201, a commonly used wireless IC tag reader can be used. The management apparatus 202 manages the information storage medium 100 by determining the status of the information storage medium 100 when reading is performed based on the read ID information and the communication status such as whether reading is possible and the intensity of radio wave when reading is performed. For example, it is possible to make management, among tools to be put in their proper place, as to which tools are currently in the proper place, which tool(s) is missing, when and which tool(s) was removed from the place. Besides tool management, information management, location management, status observation, inventory management, electronic payment and the like of the attached materials also become possible.

In a case where the information storage medium of the invention is arranged such that the elongated member is brought into contact with a conductive member such as a metal plate or a dielectric member such as water, the antenna function of the elongated member will be disabled, but the function of the sheet body to improve wireless communication will be performed.

Accordingly, when the information storage medium of the invention is used without contact with a conductive member or dielectric member, the antenna function of the elongated member can be performed, the communication distance can be extended and the reading direction limitation of the wireless IC tag can be reduced. When the information storage medium of the invention is used with contact with a conductive member or dielectric member, the communication distance is reduced as compared to the case where the information storage medium of the invention is used without contact with a conductive member or dielectric member, and thus the reading direction is limited to the direction in which the wireless IC tag is arranged. In other words, the communication distance and reading direction of the information storage medium of the invention vary when the communication environment changes.

By using such features, a change in the communication environment of the information storage medium can be detected by continuously or intermittently reading the wireless IC tag and detecting a change in the read results, whereby the information storage medium can perform a so-called sensing function.

Examples of the change in the communication environment include a status change between a state where the elongated member of the information storage medium is in contact with or adjacent to a conductive member or dielectric member and a state where the elongated member of the information storage medium is separated from the conductive member or dielectric member, and a change in the distance between the elongated member of the information storage medium and the conductive member or dielectric member.

A specific method for using the information storage medium as a sensor can be, for example, a method in which the information storage medium is affixed to the outer surface of a non-metallic water pipe formed of a resin such as vinyl chloride resin such that the elongated member of the information storage medium is in contact with the water pipe. When water is not running in the water pipe, the elongated member of the information storage medium is separated from the conductive member or dielectric member, and therefore the antenna function of the elongated member is performed. When water is running in the water pipe, the dielectric member is adjacent to the elongated member of the information storage medium, and thereby the antenna function of the elongated member is disabled, and only the effect of the sheet body to improve communication is performed.

Accordingly, the communication distance of the wireless IC tag changes between a case where water is not running in the water pipe and a case where water is running in the water pipe. The communication distance is long when water is not running in the water pipe, and the communication distance is short water is running in the water pipe.

By measuring in advance the communication distance when water is not running in the water pipe and the communication distance when water is running in the water pipe, whether water is running in the water pipe can be detected from the results obtained by reading the wireless IC tag.

The water pipe may be buried in the ground or provided in an out-of-sight place, for example, within a wall, on the ceiling or the like, but by reading the information storage medium arranged on the water pipe surface from a location where workers can work easily such as close to the ground surface, outside the wall, in a passage, it is possible to detect whether water is running in the water pipe.

It is also possible to arrange the information storage medium at a distance from the outer surface of the water pipe, and if the water pipe is broken or the like, reading is performed along the direction in which the water pipe is provided from the ground surface. If a section of the water pipe where water is running and a section of the same where water is not running are detected from a difference in the communication distance, it is possible to determine that the water pipe is likely to be broken between the two sections.

The foregoing has been described taking an example in which a change in the state of the water pipe is sensed, but the information storage medium of the invention can be used to monitor changes in the status of a factor that affects the communication distance of the wireless IC tag, such as, a temperature increase due to a steam pipe or a change in the state of a pipe having a surface on which water droplets condense when the surface reaches the dew point or less due to a change in humidity or temperature, or a pipe that conveys a dielectric material.

Examples according to the invention will be described below.

EXAMPLES

Information storage mediums according to the invention were produced by producing an IO type sheet body, affixing a wireless IC tag to the IO type sheet body, and mounting the IO type sheet body on a driver (screwdriver), a spanner and a nipper.

The IO type sheet body had external dimensions of 10 mm in length and 48 mm in width. As the first spacer 2, a PET (polyethylene terephthalate) film having a thickness of 0.1 mm was used. As the auxiliary antenna 3, an aluminum foil layer having a thickness of 0.05 mm was used, and the notch S was formed to have a length L of 8 mm and a width W of 10 mm. As the second spacer 4, a mixture of 100 parts by weight of EPDM rubber having a thickness of 1 mm and 280 parts by weight of titanium oxide filler was used. Although the bonding and adhesion of the constituent elements are optional and may be unnecessary in some cases, here, the constituent elements were fixed using a sticky material.

One obtained by attachment to a driver is referred to as Example 1, one obtained by attachment to a nipper is referred to as Example 2, and one obtained by attachment to a spanner is referred to as Example 3. These driver and nipper correspond to the tags according to the invention, and information storage mediums according to the invention.

In Example 1, the driver's body portion obtained from Vessel Co., Inc. had a length of 183 mm, and a wireless IC tag and a sheet body were attached to the vicinity of the grip portion by using a heat shrinkable cover member (available from Sumitomo Electric Fine Polymer, Inc.)

The driver was arranged such that the lengthwise direction of the driver body portion was parallel to the vertical direction, and the possible communication distance was measured by moving the reader on a horizontal plane at the same height as the wireless IC tag by shifting the reading position by 30°. Hereinafter, such a reading condition is referred to as the "vertical condition". A reading condition in which the driver was arranged such that the lengthwise direction of the driver body portion was parallel to the horizontal direction, and the possible communication distance was measured in the same manner is referred to as the "horizontal condition".

In the vertical condition, the position at which the reader and the wireless IC tag faced each other was defined as a reading position of 0°. Accordingly, a reading position of 180° means a position opposite to the wireless IC tag.

Figure 7:
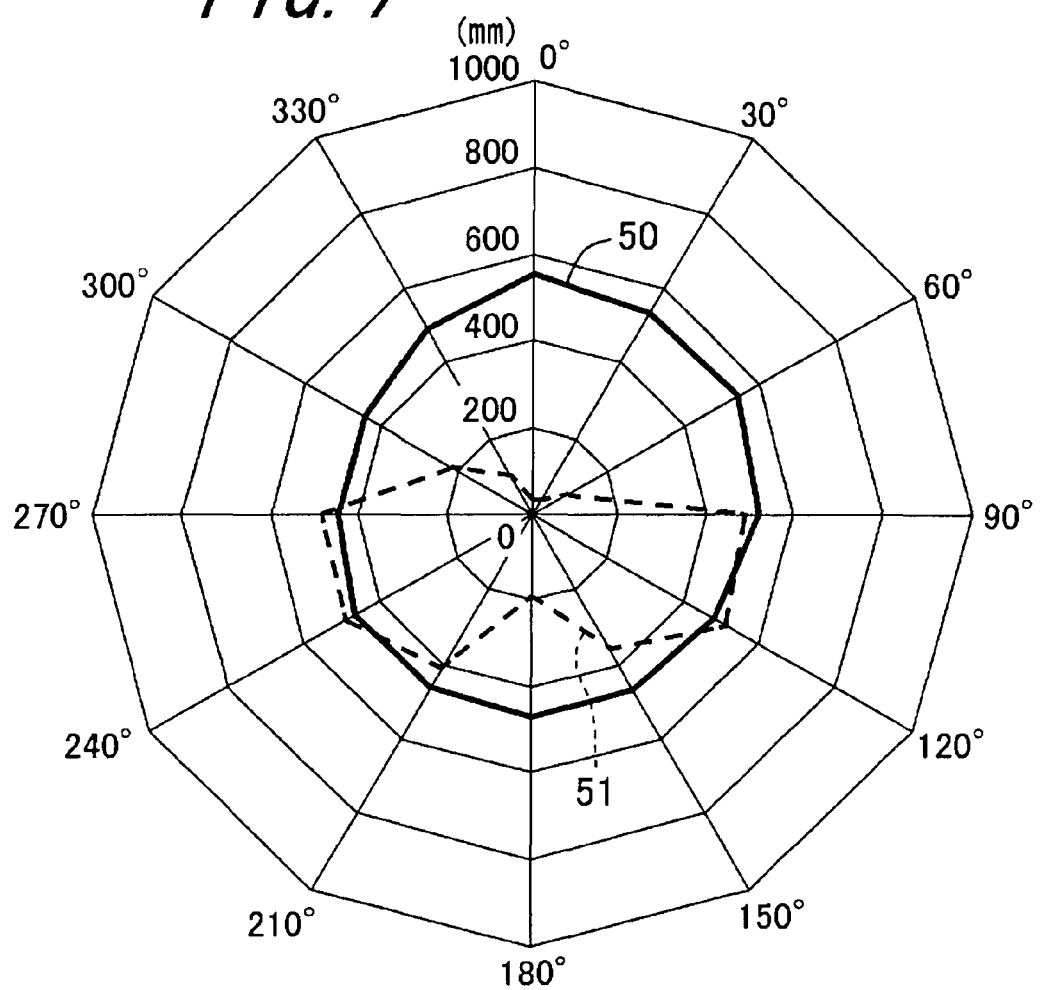
FIG. 7 is a diagram showing measurement results of Example 1.

FIG. 7 is a diagram showing measurement results of Example 1. A graph 50 of FIG. 7 showing results obtained in the vertical condition illustrates that the possible communication distance was almost the same at any of the reading positions from 0° to 360°. From a graph 51 of FIG. 7 showing results obtained in the horizontal condition, it can be seen that it matches the radiation pattern of a dipole antenna, indicating that the elongated member functioned as a dipole antenna in this example.

In Example 2, the nipper's body portion obtained from Vessel Co., Inc. had a total length of 158 mm and a width of 52 mm, and a wireless IC tag and a sheet body were attached to the inner side of a grip portion, or in other words, in substantially the center of the inner side of one of the grip portions, using a heat shrinkable cover member (available from Sumitomo Electric Fine Polymer, Inc.), such that the wireless IC tag and the sheet body conform to the curvature of the inner circumferential surface of the grip portion.

The vertical condition was used as a measurement condition, and measurement was performed in the state in which the nipper was open and in the state in which the nipper was closed.

Figure 8:
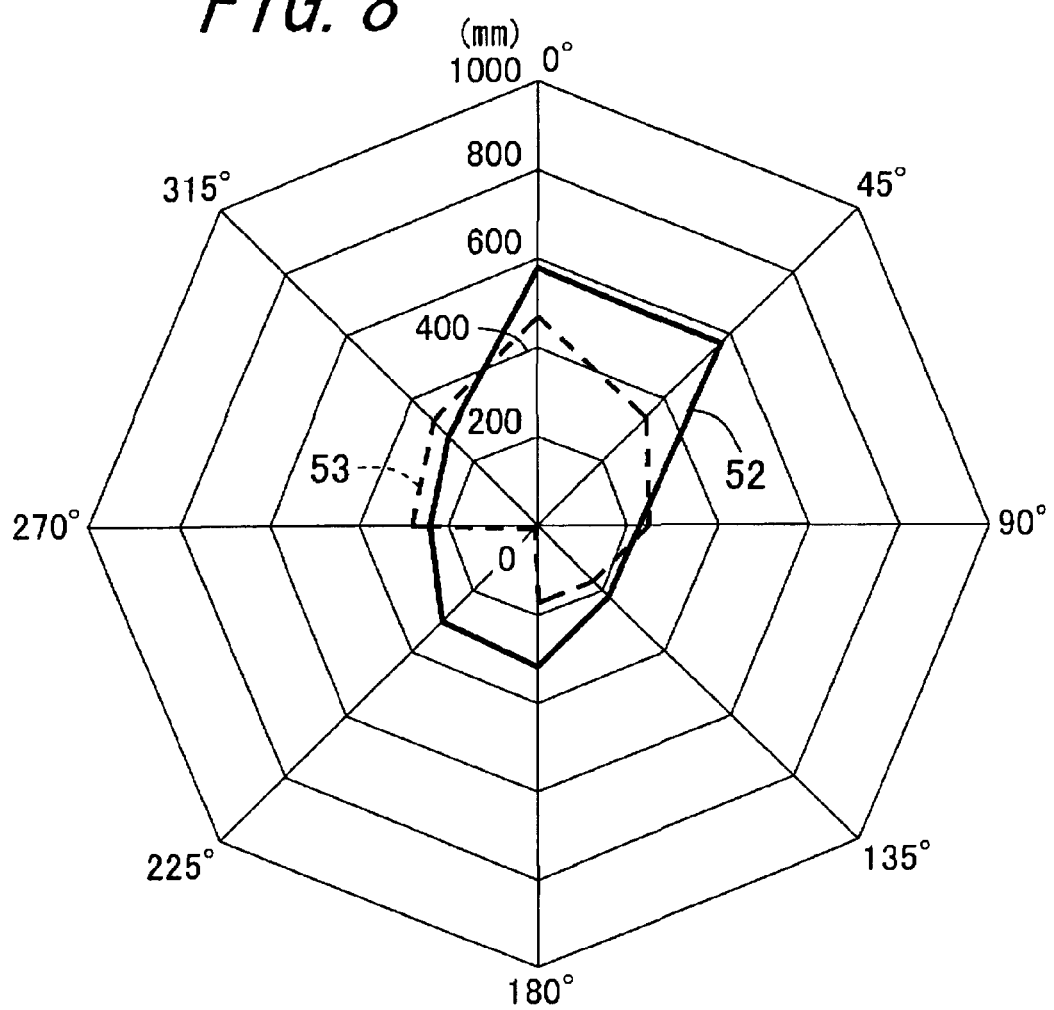
FIG. 8 is a diagram showing measurement results of Example 2.

FIG. 8 is a diagram showing measurement results of Example 2. A graph 52 of FIG. 8 showing results obtained in the state in which the nipper was open illustrates that reading was possible from any of the reading positions from 0° to 360°, but the possible communication distance differed depending on the reading position. A graph 53 of FIG. 8 showing results obtained in the state in which the nipper was closed illustrates that reading was possible almost all around the circumference, but reading was not possible at a reading position of 225°. Presumably, in the state in which the nipper was closed, the distance between one of the grip portions to which the wireless IC tag and the sheet body were attached and the other grip portion was short, and therefore communication was inhibited by the other grip portion at a reading position of 225°. However, even in this state, communication was possible in a range from 0° to 270° out of 360°, and thus the directivity was sufficiently improved.

In Example 3, the spanner's body portion was obtained from Vessel Co., Inc., and a wireless IC tag and a sheet body were attached to one side of the center portion, using a heat shrinkable cover member (available from Sumitomo Electric Fine Polymer, Inc.) Also, spanners having different lengths were prepared to examine the influence of length. The spanners had a length of 140 mm, 160 mm and 210 mm.

As Comparative Example, a wireless IC tag was affixed to a stainless steel plate having a size of 150 mm×66 mm. Similar to Example 3, in Comparative Example, the position at which the reader and the wireless IC tag faced each other was defined as a reading position of 0°, and the communication distance was measured by shifting the reading position by 45°.

Furthermore, as Example 4, an information storage medium including a cylindrical iron pipe having a diameter of 24 mm and a length of 220 mm as the elongated member was produced, and measurement was performed.

The vertical condition was used as a measurement condition in Examples 3 and 4 and Comparative Example.

Figure 9:
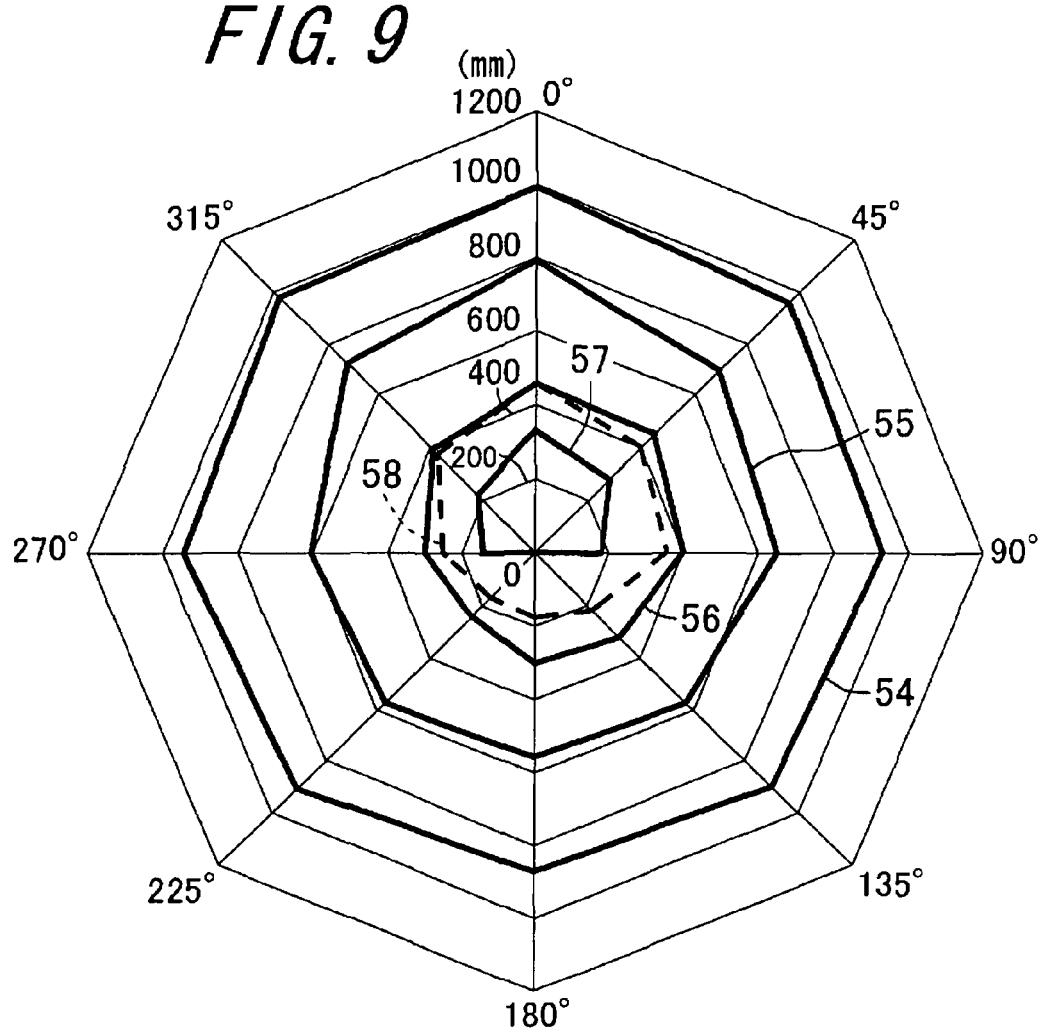
FIG. 9 is a diagram showing measurement results of Examples 3 and 4 and Comparative Example.

FIG. 9 is a diagram showing measurement results of Examples 3 and 4 and Comparative Example. A graph 54 of FIG. 9 showing results obtained when a spanner having a length of 140 mm was used, a graph 55 showing results obtained when a spanner having a length of 160 mm was used, a graph 56 showing results obtained when a spanner having a length of 210 mm was used, and a graph 58 showing results obtained when an iron pipe was used in Example 4 illustrate that reading was possible from any of the reading positions from 0° to 360°. From a graph 57 showing measurement results of the comparative example, it can be seen that the possible communication distance was short as a whole, and the possible communication distance was 0 at reading positions from 90° to 270°, or in other words, at positions where the wireless IC tag was read from the side of the stainless steel plate opposite to the wireless IC tag.

When the possible communication distances are compared, the longest possible communication distance was obtained when the wireless IC tag and the sheet body were attached to a spanner having a length of 140 mm, followed by a spanner having a length of 160 mm, and a spanner having a length of 210 mm. This is presumably because the 140 mm long spanner had a length closest to $\lambda/2$ of a radio wave of the UHF frequency band internationally approved for RFID use.

In Example 5, the same IO type sheet body as that used in Example 1 was used, and a tag "Rafsec series UPM-COMBO" available from UPM Raflatac was used as the wireless IC tag. The wireless IC tag contained NXP U-Code G2XL as an IC, and had a size of 10 mm×42 mm. The communication distance in free space was approximately 80 cm. The tag is designed such that the communication distance will be approximately doubled when attached to, for example, cardboard. Furthermore, a conductive elongated member was attached to the side of the IO type sheet body opposite to the wireless IC tag.

Figure 10:
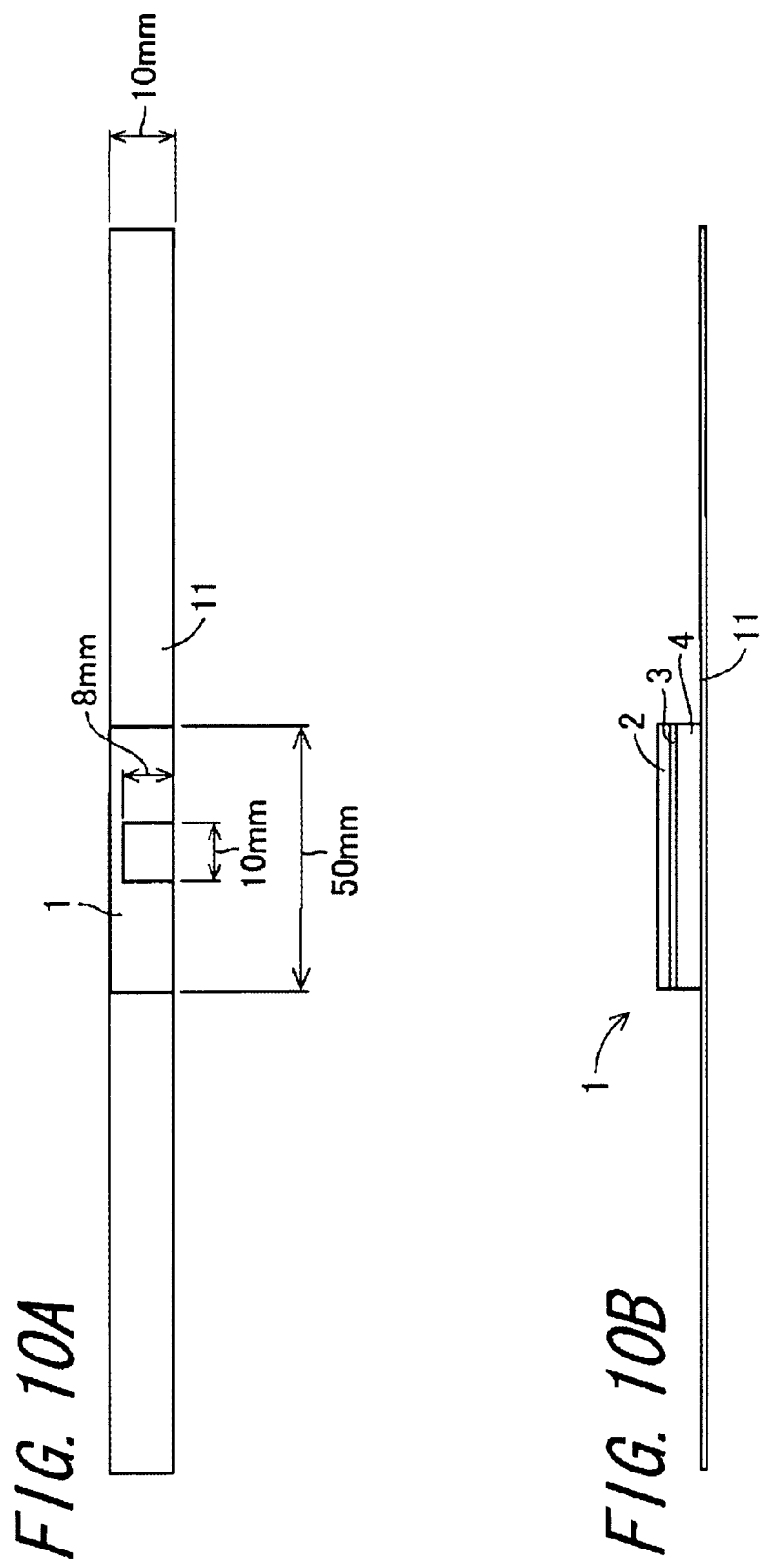
FIGS. 10A and 10B are external views showing a configuration of Example 5.

FIGS. 10A and 10B are external views showing the configuration of Example 5. FIG. 10A shows a plan view and FIG. 10B shows a side view. In this example, no hole, notch or gap was provided in the elongated member.

Figure 11:
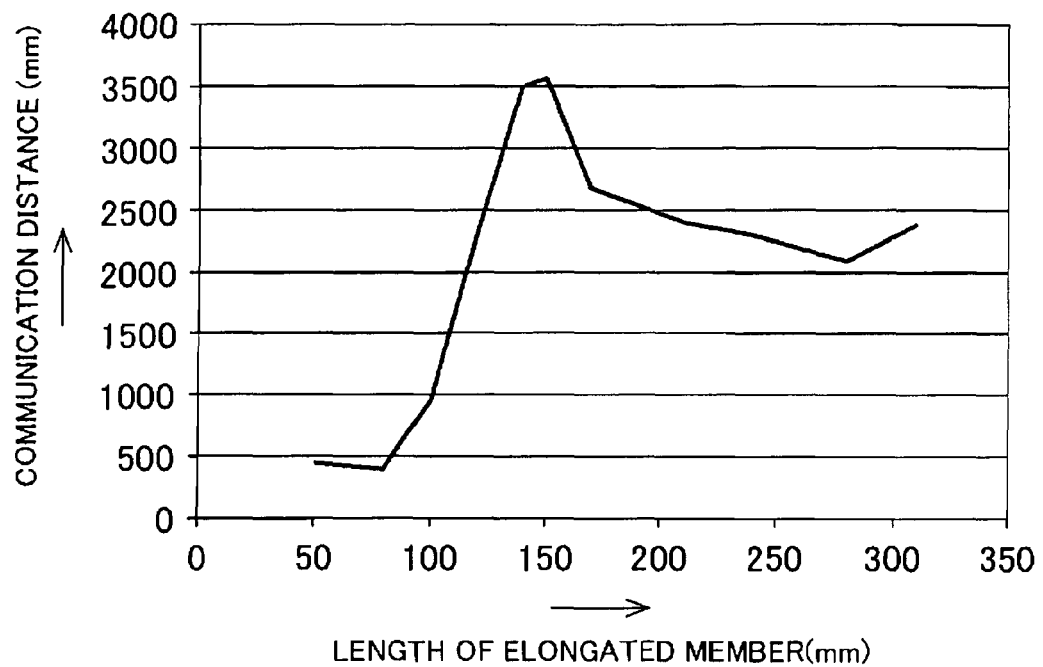
FIG. 11 is a graph showing the influence of the length of the elongated member versus the communication distance in free space.
Figure 12:
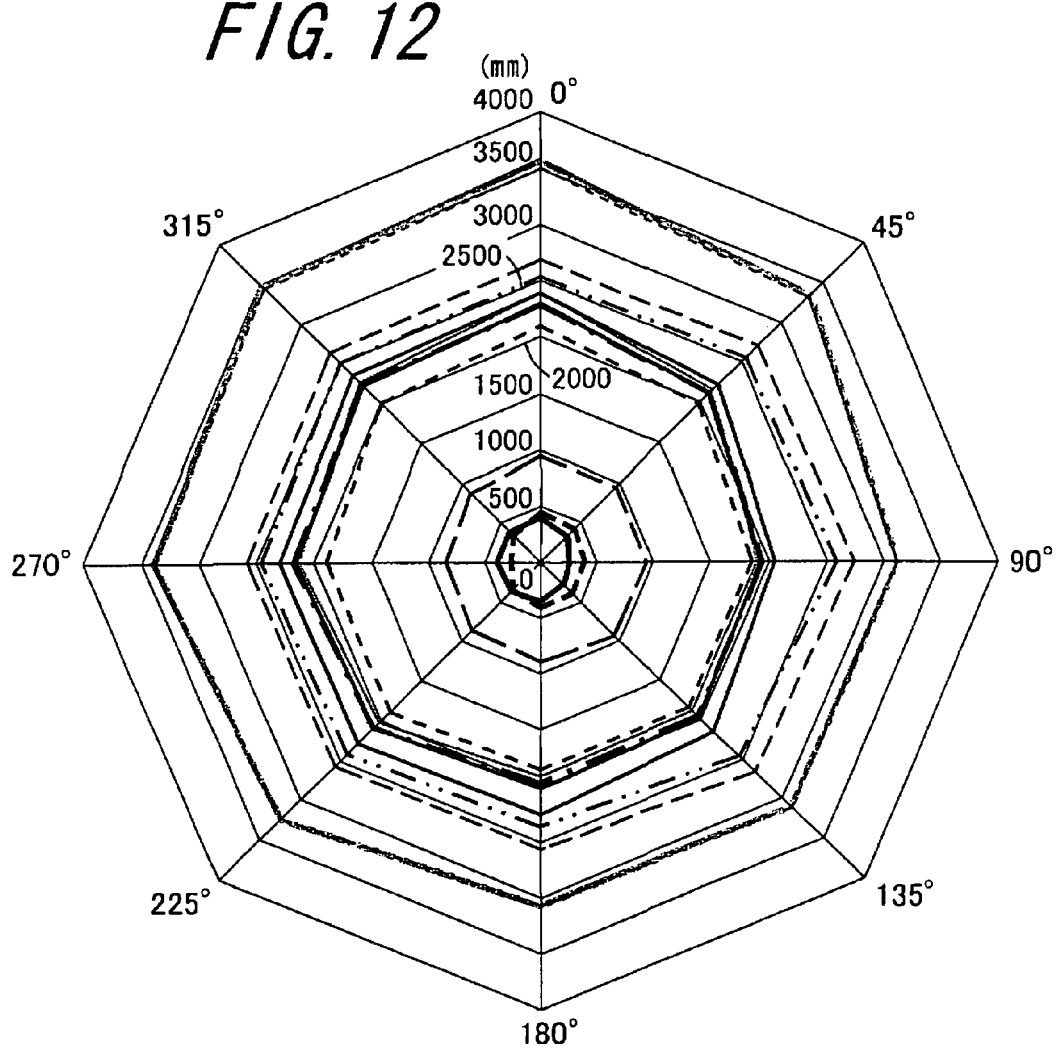
FIG. 12 is a diagram showing measurement results of Example 5.

In this example, the length of the elongated member was changed to 50, 80, 100, 120, 140, 150, 170, 190, 210, 240, 280 and 310 mm. FIG. 11 is a graph showing the influence of the length of the elongated member versus the communication distance in free space. The possible communication distance was measured in the same manner as described above by setting the position at which the reader and the wireless IC tag faced each other as a reading position of 0° and shifting the reading position by 45°. FIG. 12 is a diagram showing measurement results of Example 5. Communication measurement used a UHF frequency band approved for RFID use in Japan with 4WEIRP, assuming a reader output of 1 W, which is the highest output allowed in Japan. The communication distance shown in the graph of FIG. 12 is expressed in the unit of mm.

When the tag according to the invention produced in Example 5 was affixed to a metal plate (stainless steel plate, 200 mm×300 mm), the communication distance was 80 cm. In this case, the metal plate and the elongated member of the tag according to the invention were substantially electrically connected, and the communication distance was 80 cm irrespective of the length of the elongated member.

It can be seen that the results shown in FIG. 11 illustrate that the communication distance tends to extend as the length of the elongated member increases. When the elongated member had a length of 130 mm to 160 mm, the longest communication distance of approximately 3.5 m was obtained. The communication distance decreases as the length of the elongated member increases, but still a communication distance of 2 m or more can be ensured, achieving a communication distance approximately more than three times greater than the communication distance of the original wireless IC tag.

Furthermore, the results shown in FIG. 12 illustrate that directivity was not observed as a communication member. It was confirmed that reading was possible without any problems from the elongated member side, or in other words, even from the metal member side opposite to the wireless IC tag. FIG. 11 shows the results of the communication distance at an angle of 0°. The results show that the invention maintains good performance even when measured in free space or used on a metal plate. Such a tag having both a high performance in free space and a capability of being attached to a metal did not exist before. The tag according to the invention is a metal compatible tag capable of wireless communication even on a metal plate, and has a novel feature that the tag functions as a dipole antenna type tag in free space. Furthermore, a product or device to which the tag is affixed can be used as the elongated member. In this case, the metal compatible tag can be small in size, yet a sufficiently long communication distance can be obtained.

Furthermore, the same results can be obtained even when a tool or other metal member is used as the elongated member. Due to the property that the attached material is used as an antenna, the tag that is affixed can be small in size because the elongated member of the invention can be eliminated.

Figure 13:
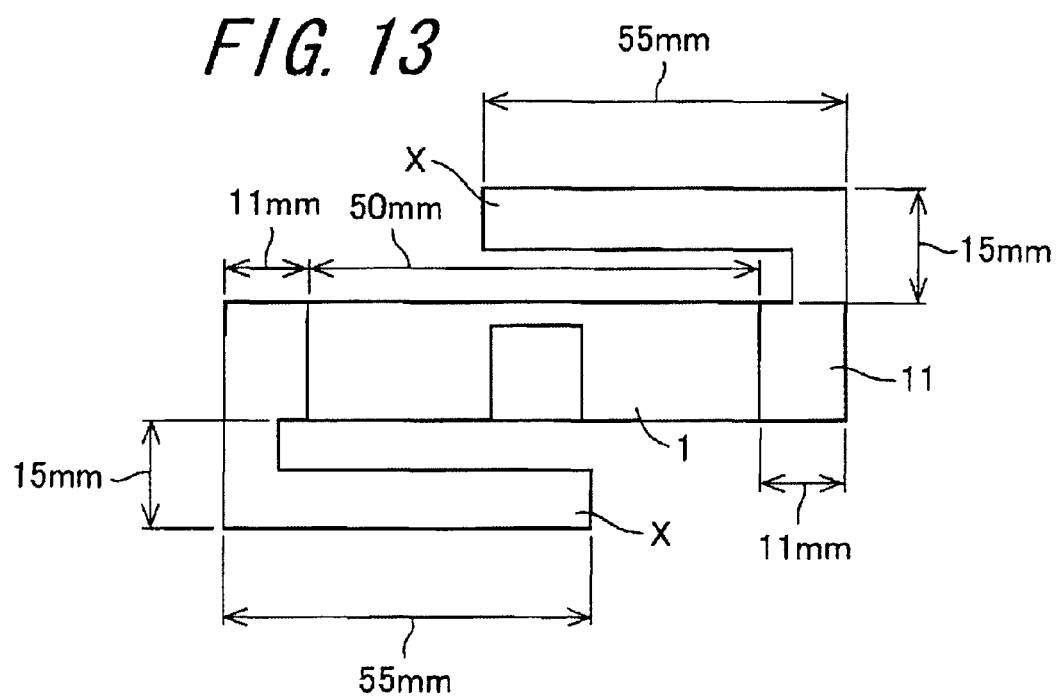
FIG. 13 is a plan view showing the configuration of Example 6.

In Example 6, the width of the elongated member was changed by bending the elongated member of Example 5. This is a tag according to the invention including the elongated member. FIG. 13 is a plan view showing the configuration of Example 6. Approximately one-quarter length portions from the ends in the lengthwise direction of the elongated member were bent into a hook shape such that the elongated member had a size of 40 mm×70 mm as a whole. The end portions (X) had an external length (the length of a portion including one end and having dimensions indicated by arrows in FIG. 13) of 55 mm and a width of 5 mm. This sufficiently fits within a size of 54 mm×86 mm such as a credit card. Furthermore, a tag with X portions having a length of 50 mm and a width of 5 mm, and a tag with X portions having a length of 50 mm and a width of 1 mm were also produced.

In Example 6, in the case of the tag with X portions having a length of 55 mm and a width of 5 mm, the communication distance was approximately 3 m. In the case of the tag with X portions having a length of 50 mm and a width of 5 mm, the communication distance was approximately 2.4 m. In this case as well, communication was performed with 4 W EIRP, assuming a reader output of 1 W, which is the highest output allowed in Japan.

Figure 14:
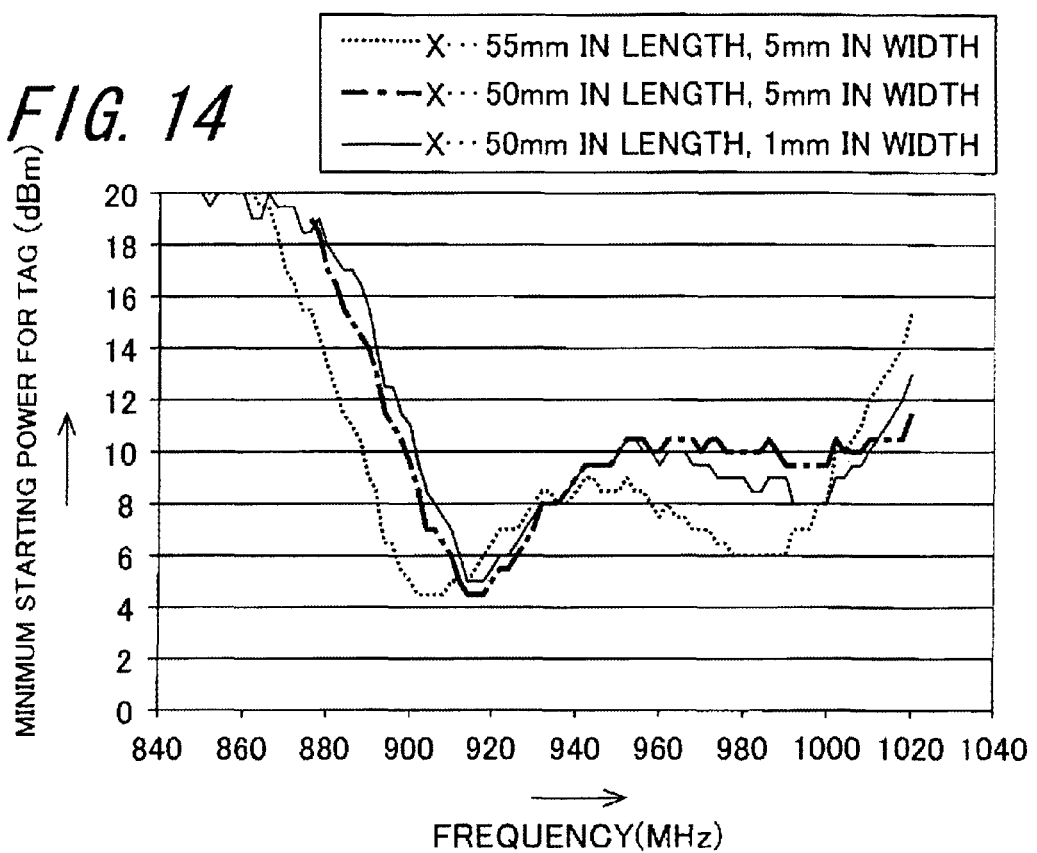
FIG. 14 is a graph showing the frequency dependence of minimum starting power obtained in Example 6.

Next, in order to measure frequency dependence of the communication characteristics, the frequency dependence of the minimum starting power was measured for a tag, using an RFID tester available from Peritec Corporation. The smaller the value of the minimum starting power of a tag, the longer the communication distance, so that it can be said that the tag has a high performance. FIG. 14 is a graph showing the frequency dependence of minimum starting power obtained in Example 6.

As can be seen from the frequency dependence shown in FIG. 14, the tags had difficulty in performing communication at a frequency approved for RFID use in Europe of 868 to 870 MHz, but were able to communicate even on the high frequency side beyond a 950 MHz band, which is a frequency approved for RFID use in Japan, exhibiting broadband characteristics that can cope with any of the frequency bands approved for RFID use across the world by performing frequency adjustment.

As described above, the information storage mediums of the sizes used in Example 6 enable RFID management or wireless communication by, for example, combining it with an employee identification card, a name card, a business card, a customer identification card, a vehicle identification card, a driver's license or the like, or by configuring it to the same card shape as a holder that holds these cards and placing it in the holder. Conventionally, commercially available UHF band wireless IC tags were used, but communication was not possible when the tags were affected by the human body, sweat, rain, humidity, clothes such as a fireproof suit. However, with the invention, it is possible to provide an information storage medium that is not affected by the influence of these factors and is able to communicate more reliably.

Figure 15:
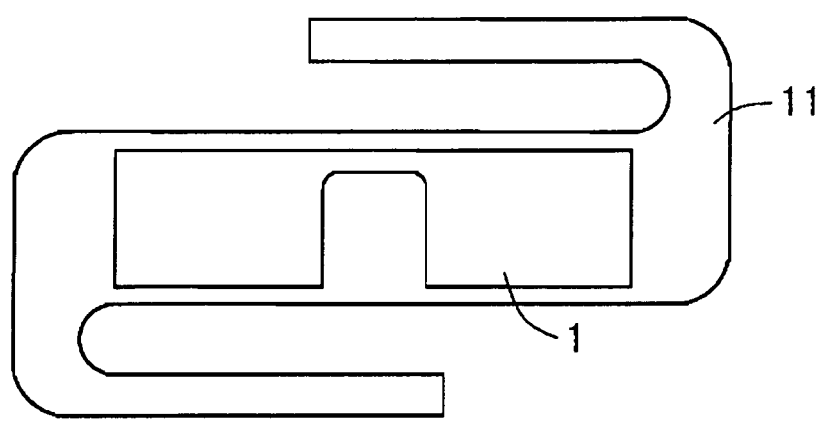
FIG. 15 is a plan view showing the configuration of another example.

Although the end portions of the elongated member had the same size in Example 6, they may not necessarily have the same size, and the outer shape is not necessarily configured to be linear. For example, as shown in a plan view of FIG. 15, the outer shape may be a combination of a line and a curve, or an outer shape composed of only curves. This applies not only to the end portions, but also to all of the constituent elements.

Next, the sensing function of the information storage medium was examined. The same information storage medium as that of Example 6 shown in FIG. 13 in which the end portions in the lengthwise direction of the elongated member were bent into a hook shape was used. The information storage medium had a size of 40 mm×70 mm as a whole, and the end portions (X) had a length of 55 mm and a width of 5 mm.

The information storage medium was affixed to the outer surface of a PET resin bottle (having a diameter of 98.7 mm), and the communication distance when the water level in the bottle was changed was measured.

Figure 16:
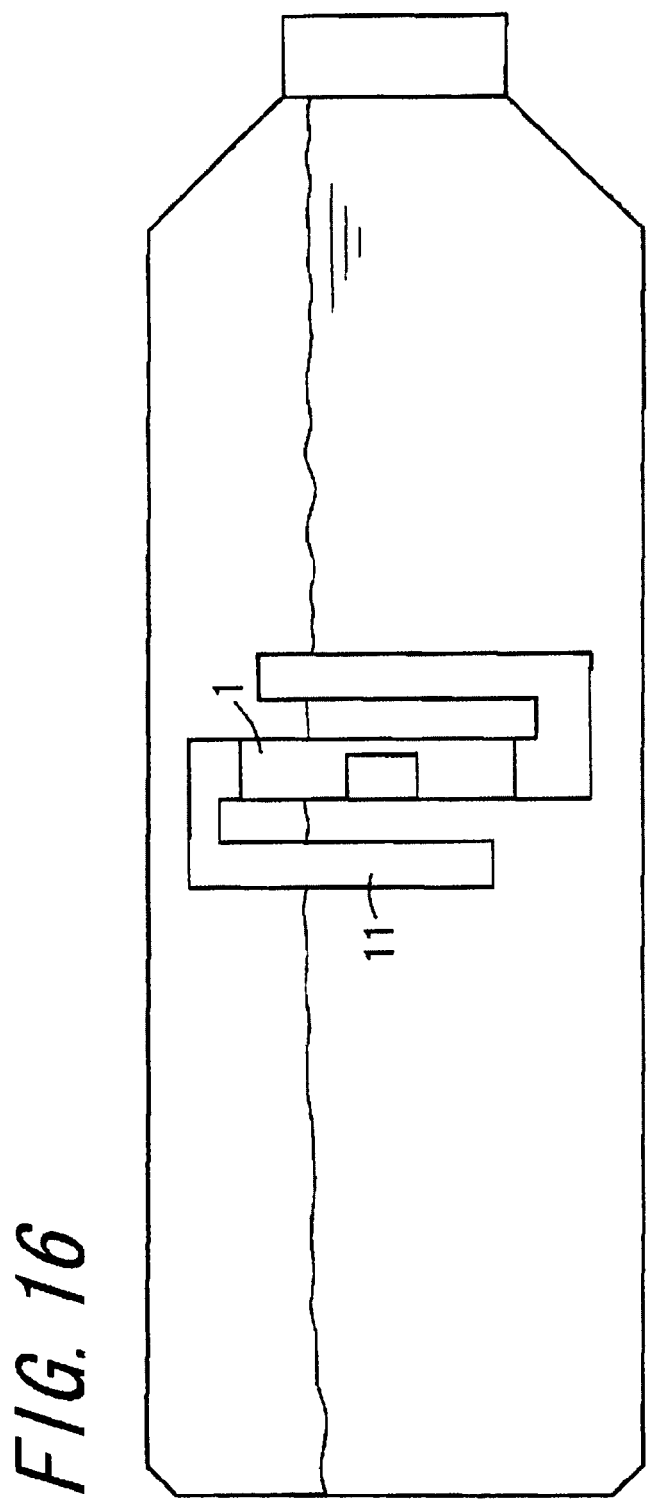
FIG. 16 is a schematic diagram showing a method for measuring the sensing function of the information storage medium.

FIG. 16 is a schematic diagram showing a method for measuring the sensing function of the information storage medium.

A bottle containing water was placed horizontally, and in this state, the information storage medium was affixed to a side of the outer surface of the bottle such that the lengthwise direction of the elongated member matched the vertical direction. The distance in which the information storage medium can be read by shifting the position of the reader in the horizontal direction is defined as the communication distance.

Figure 17:
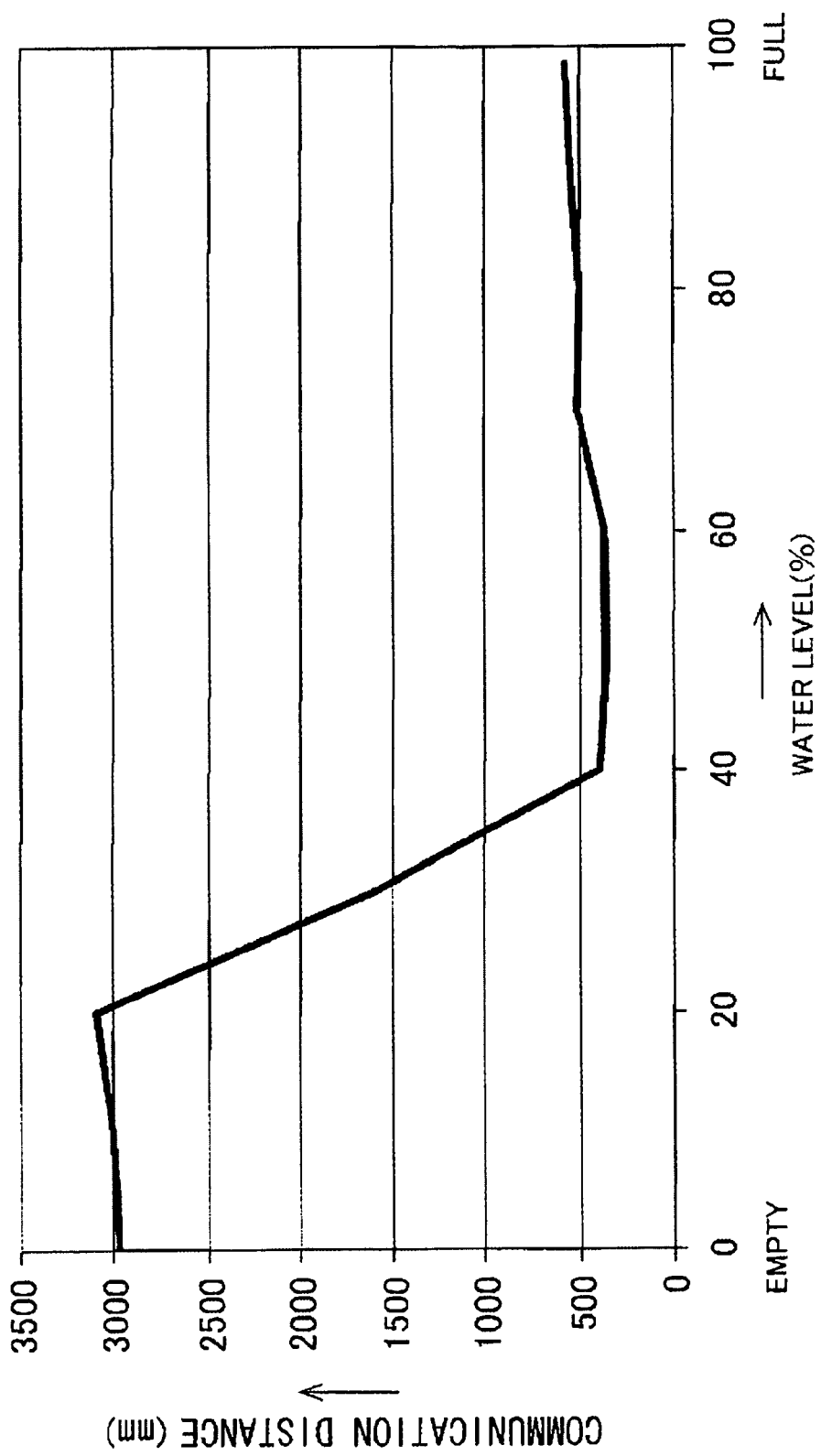
FIG. 17 is a graph showing a relationship between the water level in the bottle and the communication distance.

FIG. 17 is a graph showing a relationship between the water level in the bottle and the communication distance. The horizontal axis represents the water level (%), and the vertical axis represents the communication distance (mm). The water level was expressed in percentage, with a level when the bottle was completely filled with water taken as 100%. In other words, 100% represents a state in which the bottle was completely filled with water, and 0% represents a state in which the bottle was empty.

It can be seen that the communication distance decreased as the water level increases. When the water level exceeded 40%, the communication distance was almost constant to 100%. It can also be seen that there are roughly two regions: a region in which the communication distance changed in proportion to the change in the water level, and a region in which the communication distance was constant irrespective of the water level.

As described above, with the information storage medium of the invention, the communication distance changes according to the change in the amount of water present in the vicinity of the information storage medium, and therefore the information storage medium of the invention can be used as a sensor that detects the amount of water by measuring the communication distance.

As with the information storage medium affixed to the outer surface of the bottle, only a wireless IC tag was affixed to the bottle and measurement was performed. As a result, communication was not possible at a water level of 100%, from which it can be seen that the wireless IC tag alone cannot function as a sensor. For example, in the case where a wireless IC tag is used in an invisible condition such as being buried in the ground, if communication is not possible, it is not possible to determine whether it is due to the water level being 100% or due to an anomaly in the wireless IC tag itself. With the information storage medium of the invention, even when the water level is 100%, communication is possible in the communication distance at a water level of 100%, and it is therefore possible to reliably detect that the water level is 100%. Furthermore, if a measurement result indicating that communication is not possible is obtained, it is possible to detect that an anomaly has occurred in the wireless IC tag itself.

As described above, when a wireless IC tag and a sheet body are attached to an elongated member constituting a part of a tool, or by using the sheet body of the invention or the tag according to the invention, the tool, instrument or elongated member can function as an antenna, and the tool, instrument, elongated member, machine, device or equipment can obtain a tag function, an RFID function or a communication function. As for the communication characteristics, it was found that the null region where wireless communication is not possible can be eliminated, and long-distance communication in free space and communication adaptive to metal or water can be achieved.

It was also found that by using the fact that the antenna function of the elongated member changes due to the communication environment, it is possible to detect a change in the state of the vicinity of the information storage medium by measuring the communication distance or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information storage medium comprising:
a wireless IC tag in which information is stored;
a sheet body including
a first spacer having an arrangement surface on which the wireless IC tag is arranged,
an auxiliary antenna provided on a surface opposite to the arrangement surface of the first spacer, having a hole, notch or gap, and
a second spacer being opposite to the first spacer with respect to the auxiliary antenna; and
an elongated member formed of a conductive material,
the wireless IC tag being arranged on the arrangement surface without wire connection to the auxiliary antenna, and
the elongated member being provided to be opposite to the wireless IC tag with respect to the sheet body, wherein
the elongated member is a strip-shaped metal member or a rod-shaped metal member, and
the elongated member including a portion having size of $(\lambda/2) \times n$, wherein $\lambda$ denotes a wavelength corresponding to a resonance frequency of the IC tag and n is an integer of 1 or more.

2. The information storage medium of claim 1, wherein the elongated member is a metal member having at least one of a linear portion, a curved portion and a bent portion.

3. The information storage medium of claim 1, wherein the elongated member is a metal member that constitutes a part of a tool or device.

4. The information storage medium of claim 1, further comprising a back side conductor layer provided between the second spacer and the elongated member.

5. The information storage medium of claim 1, wherein the hole, notch or gap is provided so as to face the IC chip or a reactance loading area included in the wireless IC tag.

6. The information storage medium of claim 1, wherein at least one of the first spacer and the second spacer is formed of foam.

7. The information storage medium of claim 1, wherein a part or all of an outer surface is coated with a dielectric material.

8. A managed product comprising the information storage medium of claim 1.

9. A management system comprising:
the information storage medium of claim 1;
a reading device that reads the information stored in the wireless IC tag from the information storage medium through wireless communication; and
a management apparatus that manages the information storage medium based on the information read by the reading device and a communication status when the reading device reads the information from the information storage medium.

10. A management system comprising:
the managed product of claim 8;
a reading device that reads the information stored in the wireless IC tag from the information storage medium included in the managed product through wireless communication; and
a management apparatus that manages the information storage medium based on the information read by the reading device and a communication status when the reading device reads the information from the information storage medium.

* * * * *